United States Patent
Castro et al.

(10) Patent No.: US 11,128,707 B2
(45) Date of Patent: Sep. 21, 2021

(54) OMNICHANNEL APPROACH TO APPLICATION SHARING ACROSS DIFFERENT DEVICES

(71) Applicant: International Business Machines Corporation, Armonk, NY (US)

(72) Inventors: Paul C. Castro, Sharon, MA (US); Marco Pistoia, Amawalk, NY (US); John Ponzo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/409,838

(22) Filed: May 12, 2019

(65) Prior Publication Data
US 2019/0268415 A1    Aug. 29, 2019

Related U.S. Application Data

(62) Division of application No. 14/181,770, filed on Feb. 17, 2014, now Pat. No. 10,298,678.

(51) Int. Cl.
*H04L 29/08* (2006.01)
*H04L 29/06* (2006.01)

(52) U.S. Cl.
CPC ...... *H04L 67/1095* (2013.01); *H04L 63/0876* (2013.01); *H04L 63/20* (2013.01);
(Continued)

(58) Field of Classification Search
CPC .................................................. H04L 67/1095
(Continued)

(56) References Cited

U.S. PATENT DOCUMENTS

| 5,517,675 A | 5/1996 | O'Connor et al. |
| 5,727,202 A | 3/1998 | Kucala |

(Continued)

FOREIGN PATENT DOCUMENTS

| EP | 2023630 A2 | 2/2009 |
| EP | 2237613 B1 | 5/2013 |
| GB | 2322528 A | 8/1998 |

OTHER PUBLICATIONS

Pawar et al., "Hybrid Mechanisms: Towards an Efficient Wireless Sensor Network Medium Access Control," 14th International Symposium on Wireless Personal Multimedia Communications (WPMC), 2011, 5 pages.

(Continued)

*Primary Examiner* — Moustafa M Meky
*Assistant Examiner* — Sm Z Islam
(74) *Attorney, Agent, or Firm* — Daniel Morris; Otterstedt, Wallace & Kammer, LLP

(57) ABSTRACT

A group of remote devices executing an omnichannel application are coordinated from a network node. An omnichannel mediator coordinates formation of at least two of said remote devices into an omnichannel cloudlet. A component manager controls which of a plurality of components of said omnichannel application should optimally be placed on which individual devices of said omnichannel cloudlet and how data should flow to individual devices of said omnichannel cloudlet. A replication optimizer optimally coordinates data replication for the group of remote device.

7 Claims, 18 Drawing Sheets

(52) U.S. Cl.
CPC ............ *H04L 67/025* (2013.01); *H04L 67/04* (2013.01); *H04L 67/10* (2013.01); *H04L 67/1008* (2013.01); *H04L 67/125* (2013.01); *H04L 67/18* (2013.01); *H04L 67/42* (2013.01)

(58) Field of Classification Search
USPC ........................................................ 709/203
See application file for complete search history.

(56) References Cited

U.S. PATENT DOCUMENTS

| | | | |
|---|---|---|---|
| 7,110,793 | B1 | 9/2006 | Ishida |
| 7,360,084 | B1 | 4/2008 | Hardjono |
| 8,269,822 | B2 | 9/2012 | Zalewski |
| 8,756,194 | B1 | 6/2014 | Merrells |
| 10,298,678 | B2 | 5/2019 | Castro et al. |
| 2003/0140339 | A1 | 7/2003 | Shirley et al. |
| 2005/0252963 | A1* | 11/2005 | Adams ................ G06F 8/61 235/382 |
| 2005/0273399 | A1 | 12/2005 | Soma et al. |
| 2006/0031247 | A1 | 2/2006 | Shah |
| 2008/0163227 | A1 | 7/2008 | Son et al. |
| 2008/0222994 | A1 | 9/2008 | Shaw et al. |
| 2009/0322678 | A1 | 12/2009 | Lashina et al. |
| 2010/0045568 | A1 | 2/2010 | Schwartz et al. |
| 2010/0273450 | A1 | 10/2010 | Papineau et al. |
| 2011/0134797 | A1 | 6/2011 | Banks et al. |
| 2011/0164562 | A1* | 7/2011 | Qiu ................ H04W 72/1236 370/328 |
| 2011/0202914 | A1 | 8/2011 | Kim et al. |
| 2011/0249002 | A1 | 10/2011 | Duplessis et al. |
| 2012/0191703 | A1 | 7/2012 | Huff |
| 2012/0240103 | A1 | 9/2012 | Padmanabhuni et al. |
| 2013/0024418 | A1 | 1/2013 | Sitrick et al. |
| 2013/0117766 | A1* | 5/2013 | Bax .................... G06F 9/4405 719/323 |
| 2013/0132218 | A1 | 5/2013 | Aihara et al. |
| 2013/0235085 | A1* | 9/2013 | Kim ................. H04N 21/43615 345/660 |
| 2013/0246644 | A1 | 9/2013 | Garcia et al. |
| 2013/0254125 | A1* | 9/2013 | Sanders ............... H04L 63/102 705/310 |
| 2013/0260691 | A1 | 10/2013 | Hintermeister et al. |
| 2014/0095734 | A1 | 4/2014 | Chan et al. |
| 2014/0222994 | A1 | 8/2014 | Castro et al. |
| 2015/0088957 | A1 | 3/2015 | Kuo |

OTHER PUBLICATIONS

Taylor II et al., "VRPN: A Device-Independent, Network-Transparent VR Peripheral System," Proceeding VRST '01 Proceedings of the ACM symposium on Virtual reality software and technology, 2001, pp. 55-61.

Bierbaum et al., "VR Juggler: A Virtual Platform for Virtual Reality Application Development," Proceedings of the Virtual Reality 2001 Conference (VR'01) IEEE, 8 pages.

Seshadri et al., "SQLServer for Windows CE—A Database Engine for Mobile and Embedded Platforms," 16th International Conference on Data Engineering Proceedings, 2000, 3 pages.

Agudo et al., "Supporting mobile learning through interactive video: ViMoLe", University of Extremadura Mérida, Spain, 2012, 6 pages.

Castro et al., unpublished U.S. Appl. No. 16/409,836, filed May 12, 2019, Omnichannel Approach to Application Sharing Across Different Devices, pp. 1-52 plus 18 sheets of drawings.

Castro et al., unpublished U.S. Appl. No. 16/409,837, filed May 12, 2019, Omnichannel Approach to Application Sharing Across Different Devices, pp. 1-52 plus 18 sheets of drawings.

Paul J. Otterstedt, List of IBM Patents or Patent Applications Treated as Related, May 28, 2019, pp. 1-2.

* cited by examiner

OMNICHANNEL APPROACH TO APPLICATION SHARING ACROSS DIFFERENT DEVICES

CROSS-REFERENCE TO RELATED APPLICATIONS

This patent application is a divisional of U.S. patent application Ser. No. 14/181,770 filed Feb. 17, 2014, entitled "OMNICHANNEL APPROACH TO APPLICATION SHARING ACROSS DIFFERENT DEVICES." The complete disclosure of the aforementioned U.S. patent application Ser. No. 14/181,770 is expressly incorporated herein by reference in its entirety for all purposes.

STATEMENT OF GOVERNMENT RIGHTS

Not Applicable.

STATEMENT REGARDING PRIOR DISCLOSURES BY THE INVENTOR OR A JOINT INVENTOR

Not Applicable.

FIELD OF THE INVENTION

The present invention relates to the electrical, electronic and computer arts, and, more particularly, to pervasive software, hand-held devices, device discovery, wireless communications, and the like.

BACKGROUND OF THE INVENTION

People commonly own and use multiple devices to perform a single task throughout the day. Application ("app") developers create versions of apps that can be projected to multiple device endpoints so the user can access a given app regardless of what device he or she is using. Running a mobile application on multiple devices is now the rule and not the exception. Users commonly have multiple devices that may come from a variety of vendors, and routinely use a number of devices to perform tasks throughout the day.

SUMMARY OF THE INVENTION

Principles of the invention provide techniques for an omnichannel approach to application sharing across different devices. In one aspect, an exemplary system for coordinating, from a network node, a group of remote devices executing an omnichannel application, includes an omnichannel mediator that coordinates formation of at least two of said remote devices into an omnichannel cloudlet; a component manager that controls which of a plurality of components of said omnichannel application should optimally be placed on which individual devices of said omnichannel cloudlet and how data should flow to individual devices of said omnichannel cloudlet; and a replication optimizer that optimally coordinates data replication for the group of remote device.

In another aspect, an exemplary method includes the step of obtaining, at a replication optimizer running on at least one hardware processor in a network node, a request from a first remote device to join a group of remote devices executing an omnichannel application. Said request includes a common key identifying said group of remote devices executing said omnichannel application. Additional steps include adding said first remote device to said group of remote devices executing said omnichannel application; updating topology of said group of remote devices executing said omnichannel application to obtain an updated group topology; and establishing a data replication plan for said group of remote devices executing said omnichannel application, based on said updated group topology. A still further step includes obtaining, at said replication optimizer running on at least one hardware processor in a network node, an indication from one device of said group of remote devices executing said omnichannel application, that a data update has occurred for said omnichannel application on said one device of said group of remote devices executing said omnichannel application. An even further step includes sending, from said replication optimizer running on at least one hardware processor in a network node, to said group of remote devices executing said omnichannel application, at least one of:

(i) said data replication plan, and
(ii) instructions in accordance with said data replication plan, to specify how said data update for said omnichannel application on said one device of said group of remote devices executing said omnichannel application is to be propagated to remaining devices of said group of remote devices executing said omnichannel application.

In still another aspect, another exemplary method includes the step of loading, at a component manager running on at least one hardware processor in a network node, a specification for an omnichannel application to execute on a group of remote devices. Said omnichannel application has a plurality of components including at least one view component and at least one headless component. Additional steps include building, with said component manager running on said at least one hardware processor in said network node, a model describing how said group of remote devices is configured; creating, with said component manager running on said at least one hardware processor in said network node, a flow plan, based on said specification and said model, describing which of said plurality of components should be executed on which individual devices of said group of remote devices and how data should flow to individual devices of said group of remote devices; and sending said flow plan from said component manager running on said at least one hardware processor in said network node, to said group of remote devices, said flow plan.

In a further aspect, an exemplary method includes the steps of authenticating, at an omnichannel mediator running on at least one hardware processor in a network node, a remote device that wishes to participate in an omnichannel cloudlet to execute an application; and, responsive to said authentication, sending, from said omnichannel mediator running on said at least one hardware processor in said network node, to said remote device that wishes to participate in said omnichannel cloudlet to execute said application, instructions enabling said remote device that wishes to participate in said omnichannel cloudlet to execute said application to enter said omnichannel cloudlet with at least one other remote device. Further steps include obtaining, at said omnichannel mediator running on said at least one hardware processor in said network node, topology and operating state information regarding said remote devices in said omnichannel cloudlet; based on said topology and operating state information regarding said remote devices in said omnichannel cloudlet, and based also on application component configuration policies, preparing, with said omnichannel mediator running on said at least one hardware processor in said network node, link instructions specifying how said remote device is to link to said at least one other remote device within said omnichannel cloudlet; and sending, from said omnichannel mediator running on said at least one hardware processor in said network node, to said remote device that wishes to participate in said omnichannel cloudlet to execute said application, said link instructions.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Ability to use complementary resources on multi-device applications in an efficient manner Increase data availability by replicating and synchronizing to edge-of-network devices Decrease load on cloud by managing transient data that never needs to be committed to cloud data systems These and other features and advantages of the present invention will become apparent from the following detailed description of illustrative embodiments thereof, which is to be read in connection with the accompanying drawings.

DETAILED DESCRIPTION OF PREFERRED EMBODIMENTS

Cloud Computing Aspects

Figure 1:
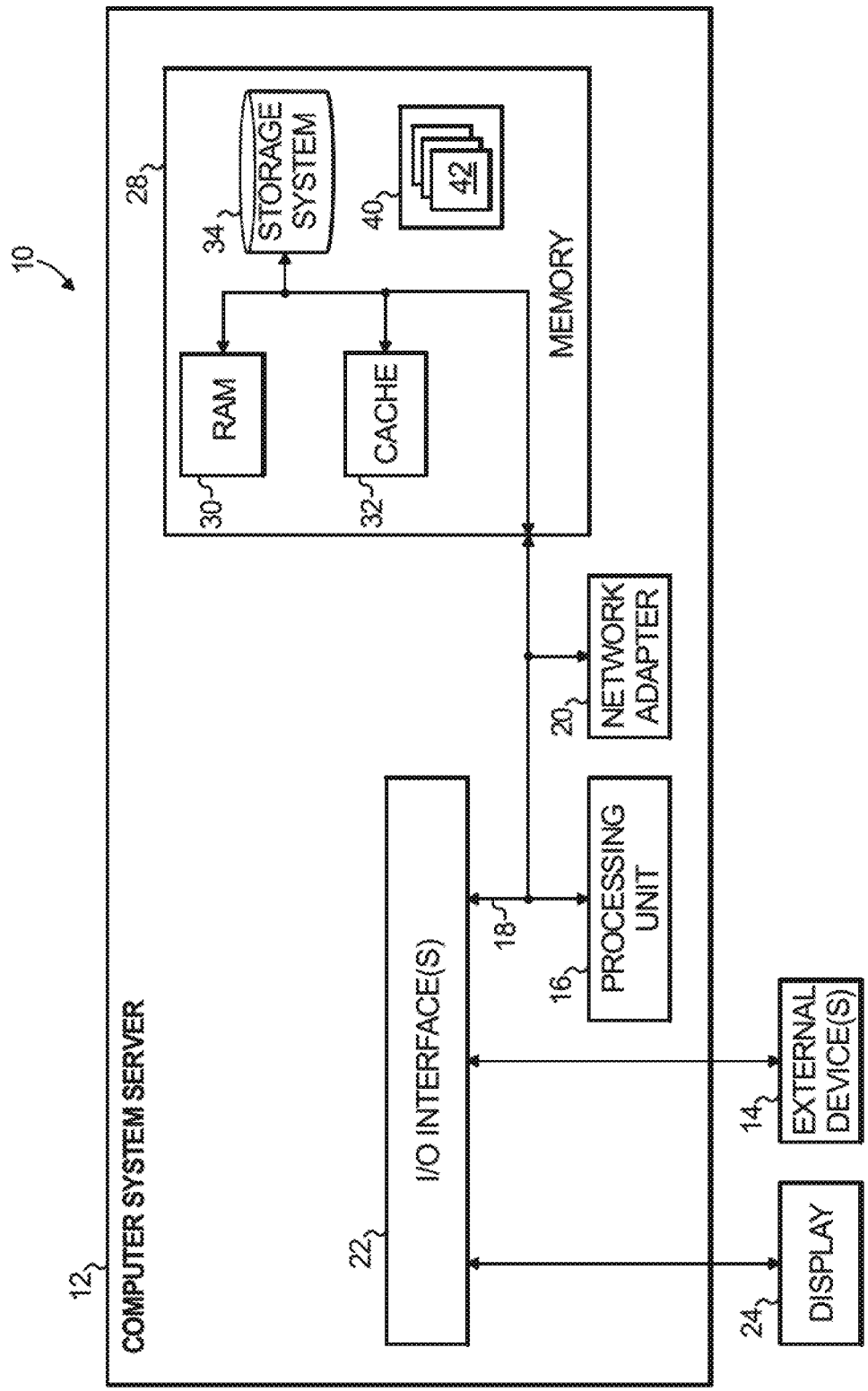
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
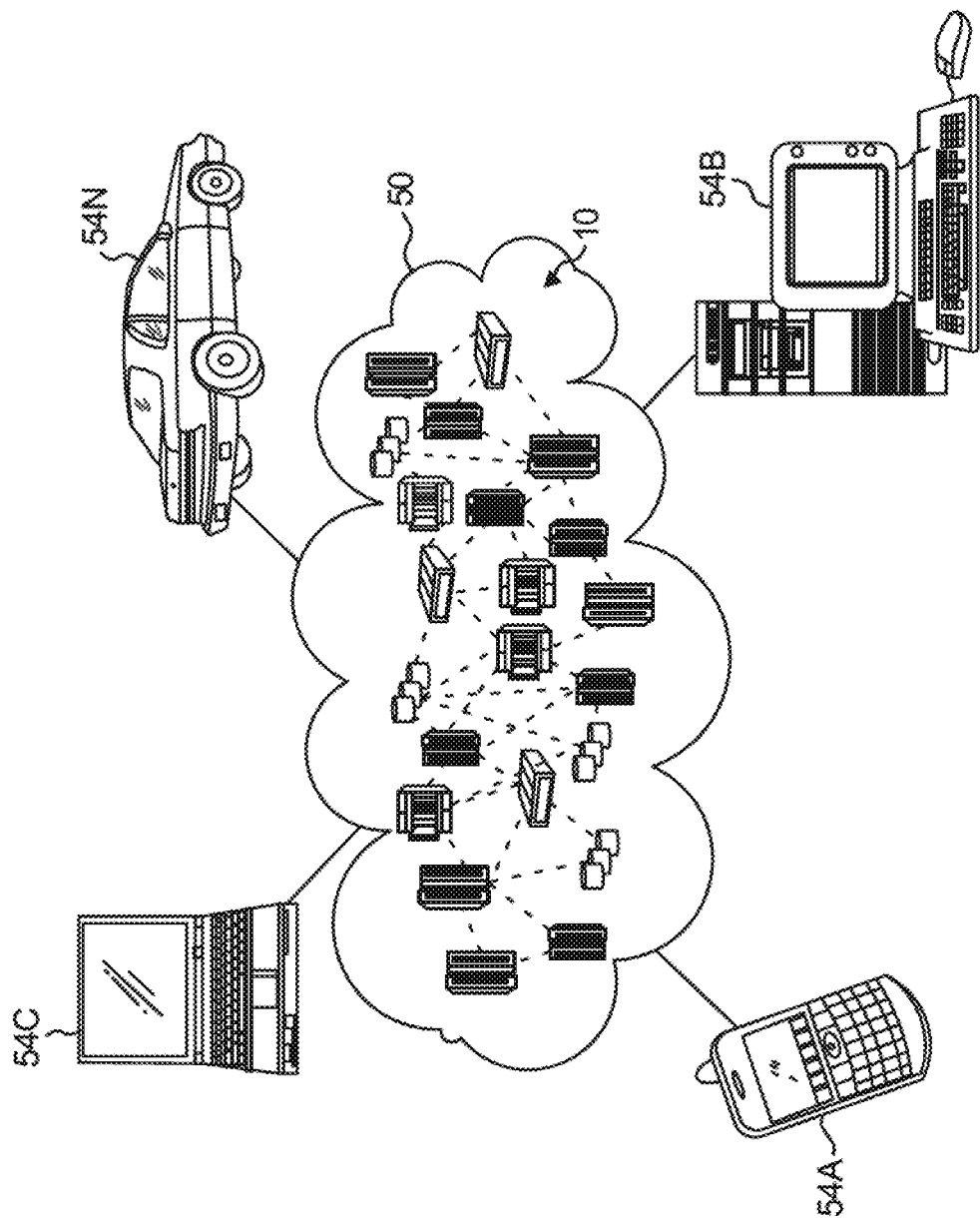
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
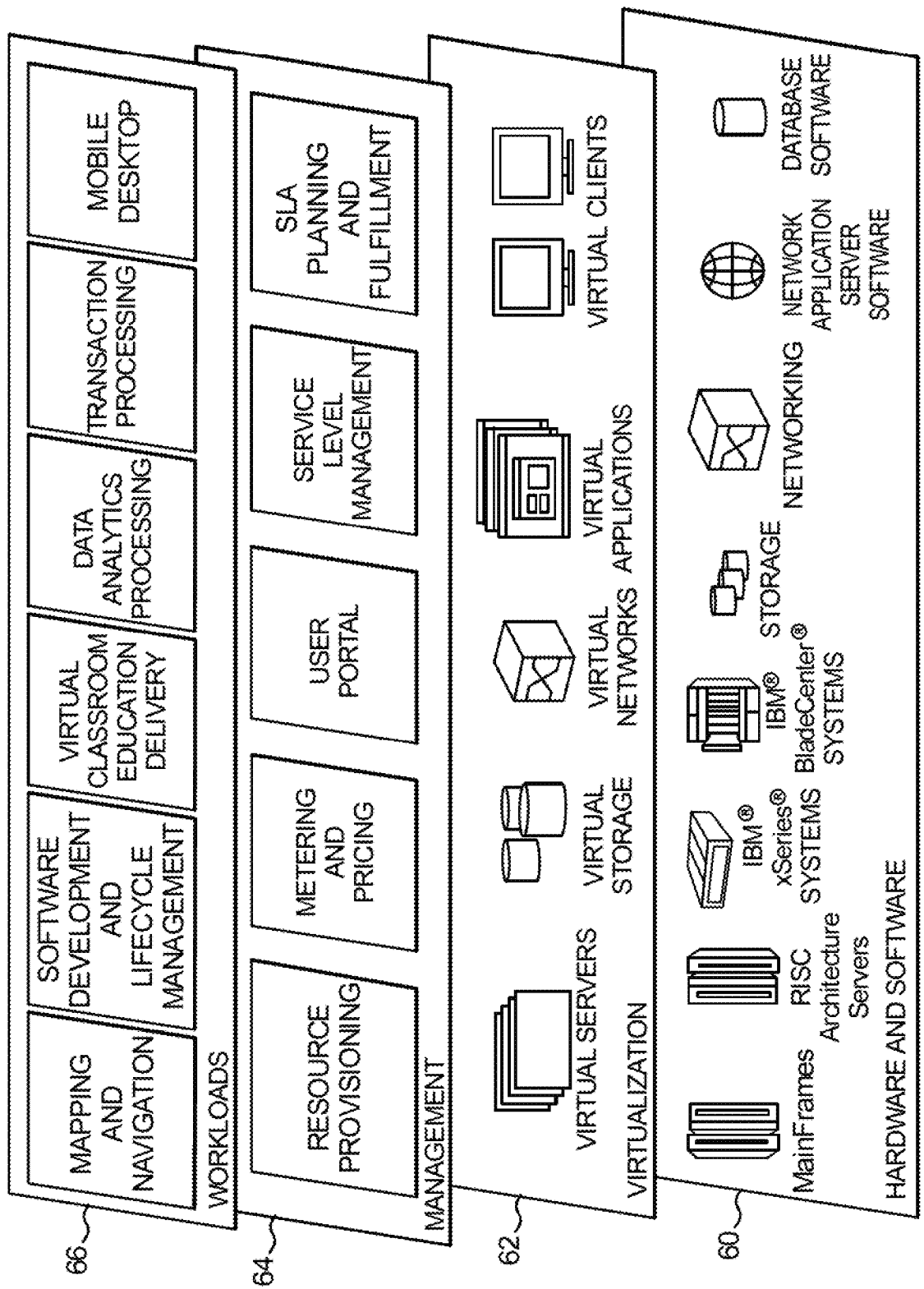
FIG. 3 depicts abstraction model layers according to an embodiment of the present invention.

FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Managing Data Replication and Governance in Omnichannel Applications

Omnichannel applications have software components that run on across multiple devices either simultaneously, or in series. At a fundamental level, these components form a distributed application that needs to seamlessly share data and commands and be reactive to non-deterministic inputs from the user or the environment. One or more embodiments provide data replication middleware that can be easily integrated into a mobile application that provides an opportunistic and context-aware synchronization service to form the basic building block of an omnichannel application. The data replication system monitors the state of the set of devices in a data sharing group and automatically optimizes how replication should take place to meet objective function(s) such as reducing energy cost or the use of a metered network.

People commonly own and use multiple devices to perform a single task throughout the day. Application ("app")

developers create versions of apps that can be projected to multiple device endpoints so the user can access a given app regardless of what device he or she is using. It will soon be common for an app to be "partially" projected to an endpoint. Applications can be deconstructed into components, where only certain components of that app will be resident on each device. This will allow the creation of true omnichannel apps that will run across devices that will share resources and leverage the complementary strengths of each. For example, a user may watch a video on a large screen but control the playback using a mobile device.

At a fundamental level, enabling an omnichannel application requires a robust and flexible data sharing mechanism so each application component can work off a common, shared application state and communicate changes across devices in a timely fashion. One way to enable this is to utilize a cloud-based service to synchronize data across devices. For example, services like iCloud® (Registered mark of APPLE Inc. Cupertino, Calif., USA), Dropbox® (Registered mark of DROPBOX, INC. San Francisco, Calif., USA), and Google Drive™ (mark of Google Inc. Mountain View, Calif., USA) offer the ability for devices to synchronize directly to the cloud. However, these services are insufficient to enable omnichannel applications because their synchronization schedules are periodic and cannot support low-latency synchronization requirements. Also, these services enforce a hub communication technology where each device has to synchronize with the cloud, regardless of whether the data is located on a nearby device. Finally, these services provide no facility for context-aware synchronization, where semantics of the data can be taken into account to establish a synchronization strategy that can minimize energy usage or the user of metered networks.

Figure 4:
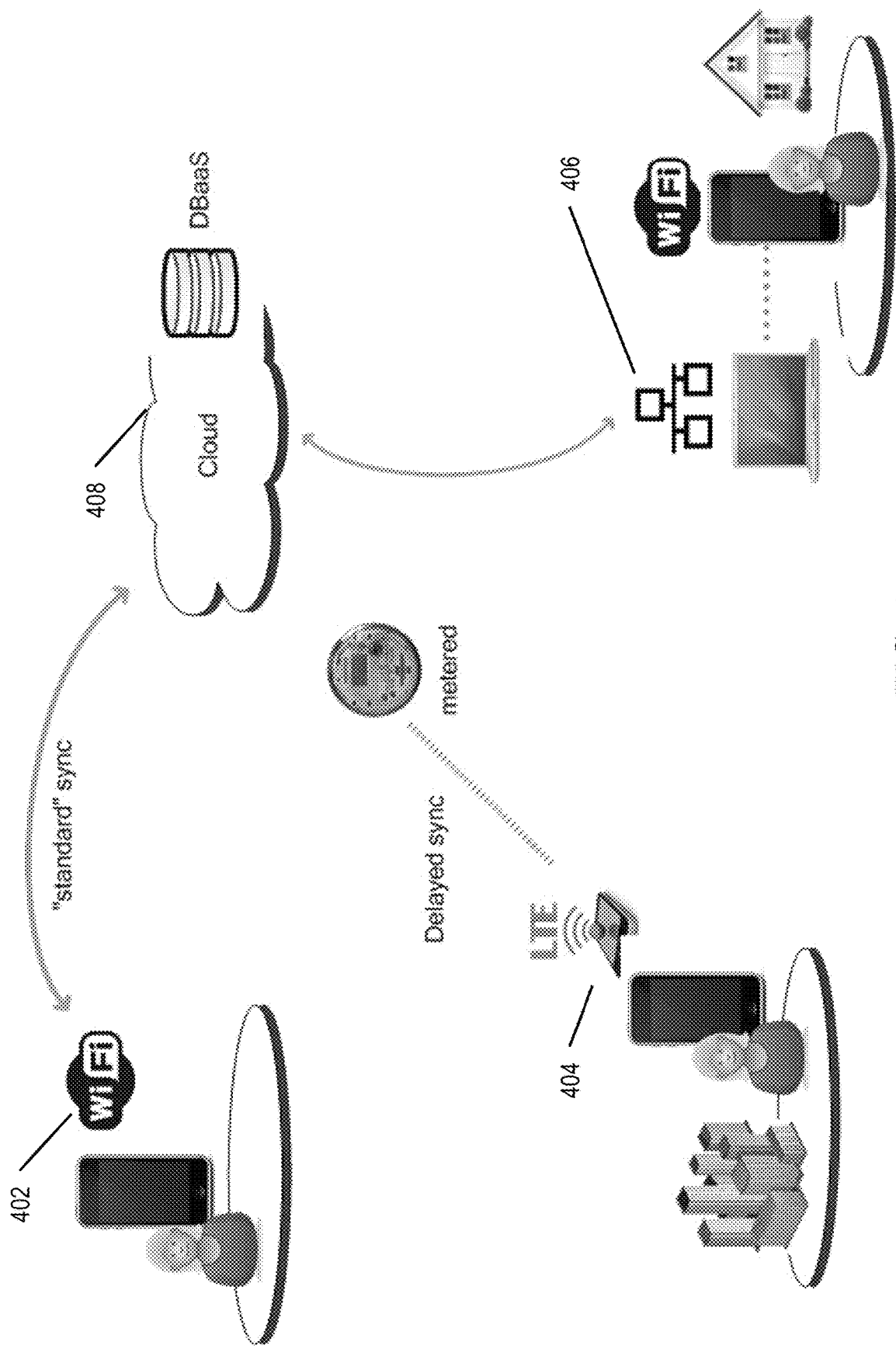
FIG. 4 shows an exemplary scenario enable by one or more embodiments.

One or more embodiments provide data replication and synchronization services that are both content-aware and opportunist. FIG. 4 shows a scenario enabled by one or more embodiments. In the figure, as seen at 402, a user on a mobile device connected through Wi-Fi is able to perform "standard sync," where the device periodically synchronizes with the cloud 408, but additionally may receive real-time updates of changes that should be applied to his or her local copy of the data. As seen at 404, the user then becomes mobile and the device is connected to the cloud through an expensive LTE connection that is metered by his or her cellular carrier. One or more embodiments allow the semantics of the data to be taken into account; in this mode, only high priority data receives and sends updates while other, delay-tolerant data, remains unaffected. Finally, as seen at 406, the user returns to a Wi-Fi network that has a nearby laptop attached through Ethernet to the cloud. The device receives the delayed updates, which have been pre-fetched from the cloud. This "side-loading" of data is less expensive than the direct download and in some cases may improve the overall latency of synchronizing with the cloud.

Figure 5:
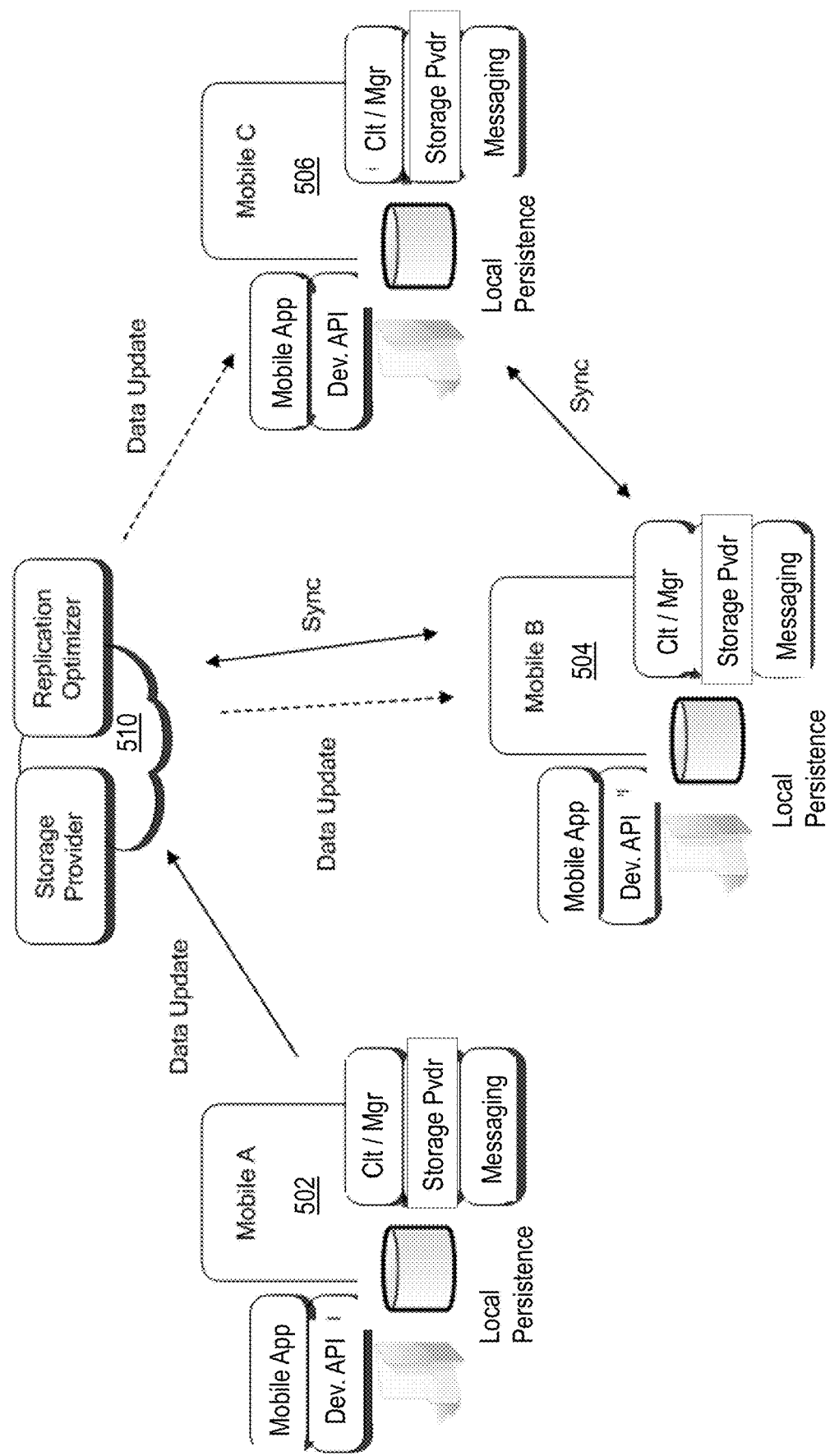
FIG. 5 shows cloud and client-side aspects of an exemplary embodiment.

FIG. 5 provides an overview of the cloud and client-side aspects of one or more embodiments. In the figure, three mobile devices (Mobile A 502, Mobile B 504, and Mobile C 506) are connected to the cloud 510 through a network connection and communicate with a Replication Optimizer 511 and Storage Provider. The latter is a "big dumb disk" in the cloud 510 for persisting files, key value pairs, and relational table data, and other forms of data as required by the application. This former is a cloud component that mediates the data replication and synchronization opportunities among the three devices. During replication, the Replication Optimizer may refer to the Storage Provider if the mobile devices need to store data in the cloud. The Replication Optimizer is indifferent, however, to the Storage Provider and one or more embodiments allow the user of any enterprise or consumer Storage Provider service through a common interface.

Each device installs a minimal set of software components to access the replication service provided by one or more embodiments. In FIG. 5, a mobile app (not separately numbered to avoid clutter) is registered with the Replication Optimizer to utilize a "governed" directory of data that it accesses through a developer API. For example, one possible abstraction is that of a file directory that the app can use to store files. However, this could also be any other kind of persistence model—for example the governed directory can be viewed as an object store that has put and get semantics for storing data. Governed directories across devices can be linked by using a common key that identifies them to the Replication Optimizer as sharing peers. For example, some embodiments use an application ID and user ID combination to create this common key. When the application launches, it identifies itself with this key and the Replication Optimizer will then attempt to keep those directories synchronized.

The developer API (not separately numbered to avoid clutter) allows the mobile app to set governance policies over the data it contains. One or more embodiments allow the mobile app to specify a security policy, such as an encryption strategy for the data, and also the ability to turn on data provenance tracking, where information about application data operations can be logged and stored by the Replication Optimizer for later analysis. For example, the Replication Optimizer can track the replication of a data item across devices using provenance tracking.

In FIG. 5, Mobile A 502 locally updates its governed directory (e.g. it writes new data to it). The Client Manager (not separately numbered to avoid clutter) runs transparently from the mobile app and monitors the data operations that occur to the contents of the governed directory. It also monitors the operating conditions of the device (when possible) and communicates this to the Replication Optimizer for planning purposes.

When the Client Manager detects a data operation has changed the governed directory, it communicates this to the Replication Optimizer. The Replication Manager creates a plan for how this update should be applied across Mobile B 504 and Mobile C 506. In one or more embodiments, the plan is calculated in the cloud and may be communicated to each mobile device. If this is the case, the mobile device will follow the plan to synchronize. For example, a plan could be a set of instructions to the device such as:

1. Wait for Wi-Fi connection
2. Retrieve new file.

These instructions can be encoded in a multitude of forms such as XML, binary instructions, etc.

In order to reduce the necessary logic on the client, it is possible that the plan is executed by only sending commands from the cloud, which the client will immediately respond to. For example, rather than receiving a complete set of instructions, the Replication Optimizer can monitor the conditions of a device and send the instruction when appropriate.

The Storage Provider on the client (not separately numbered to avoid clutter) assists in the synchronization of the files by providing an interface to the cloud-based storage provider. When the client manager synchronizes (or receives updates that need to be applied) it will use the storage provider to interact with the cloud-based storage provider to store data. However, for opportunistic synchronization, such as side-loading between peer devices, the Client Manager can bypass the storage provider and communicate updates directly to the peer device.

The messaging component on the mobile device (not separately numbered to avoid clutter) handles the asynchronous messages that it may send and receive to the Replication Optimizer and other devices. It allows all devices to be informed of the latest state of the data in the governed directory even if their replica has not synchronized yet. One or more embodiments employ messaging to communicate any important data update information but do not necessarily need to actually send the update itself. Rather, the device receives the message about the updated, but then uses the Client Manager to retrieve the actual data. For example, if Mobile A 502 creates a new file, Mobile B 504 and Mobile C 506 will receive messages that a new file was created but will not actually receive the new file. Instead, the mobile devices will consult the plan (if any) they received from the Replication Optimizer for instructions on how to apply a "create file" update. If they need to replicate the file, they will do so through the Client Manager and Storage Provider interfaces.

Figure 6:
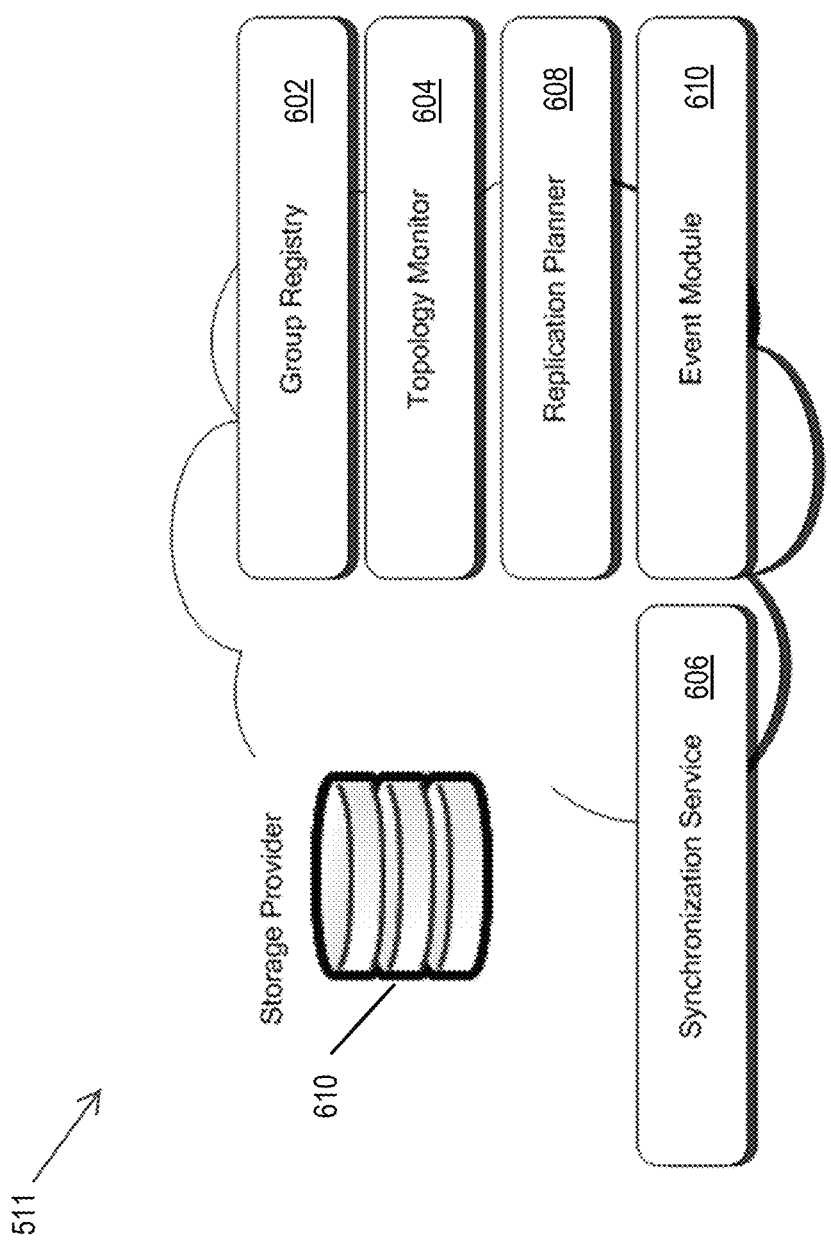
FIG. 6 shows a replication optimizer, in accordance with an exemplary embodiment.

FIG. 6 shows the main components in the Replication Optimizer. Storage provider 610 is the same as that associated with cloud 510 in FIG. 5. In FIG. 6, the Synchronization Service 606 provides an API for performing full synchronization. In some embodiments, this could be a file synchronization API. This API would provide the facility for the mobile client and the cloud to exchange information about changed files while the two were disconnected. Based on this change information, the client and server then initiate a full synchronization protocol (for example the one implemented by rsync, a well-known algorithm for minimizing data transfers while synchronizing files). This is considered "full" because complete information about the state of each replica is typically used to perform the synchronization. At the end of this process, both replicas should be the same.

If the app is now online and can communicate with the Replication Optimizer, it does not have to do a full synchronization anytime there is a change to the replica. Instead, it can receive events about changes as described previously through messages. The Event Module 610 in the Replication Optimizer manages the routing and sending of these events. For routing, the Event Module knows what updates should be forwarded to what clients. Some embodiments use an off-the-shelf message broker for this, where each message can be tagged by the common key used to link shared directories. The message broker follows the semantics typical of publish/subscribe systems that can quickly match subscription requests to events and forward them. It may also have facilities to log a message and store and forward them if the intended recipient is offline. However, these capabilities are optional in one or more embodiments.

For sending messages, the Event Module 610 may have to match to a schedule. For example, Mobile A 502 may change a file and send a message to the Replication Optimizer. The Event Module 610 may delay sending information about this event to any mobile device currently not on Wi-Fi. Alternatively it could send the message immediately to the device.

To enable replication planning, the Replication Planner consults the Topology Monitor 604 to receive the latest information about the operating conditions of the peers sharing a governed directory. The Topology Manager can keep track of the location of devices, what networks they are attached to, system-level statistics such as CPU load, and other information such as the current application executing on the device. This information is kept up-to-date by the Client Manager running on the device 502, 504, 506, which is monitoring this information and sending to the Replication Optimizer. With complete topology information, the Replication Planner 608 can calculate the best replication plan for different replication situations (namely, data created, data updated, data deleted), which our invention will execute as described previously.

The Replication Planner 608 can also be used to ensure that a sufficient number of replicas exist to prevent data loss. For example, if a data item is only available on a single device, if that device goes offline than other devices will not have access to it. To prevent this, the Replication Planner can craft a plan to ensure that a sufficient number of copies are always available. For example, the requirement to be resilient to the loss of one device can be translated to a plan of "ensure there are at least two copies of each data item across devices."

There are many techniques that can be applied to create a plan. One or more embodiments provide a pluggable interface so system designers can add an algorithm to the Replication Optimizer to better meet the application requirements. This is beneficial because many times optimization must have an understanding of the semantics of the data, i.e. which data must be updated immediately versus which data is more delay-tolerant to updates.

In a non-limiting example, group registry 602 is a database; topology manager 604 and replication planner 608 are server-based applications; event module 610 is server-based code that sends and receives events; and synchronization service 606 is a server-based application that responds to REST API events.

Figure 7:
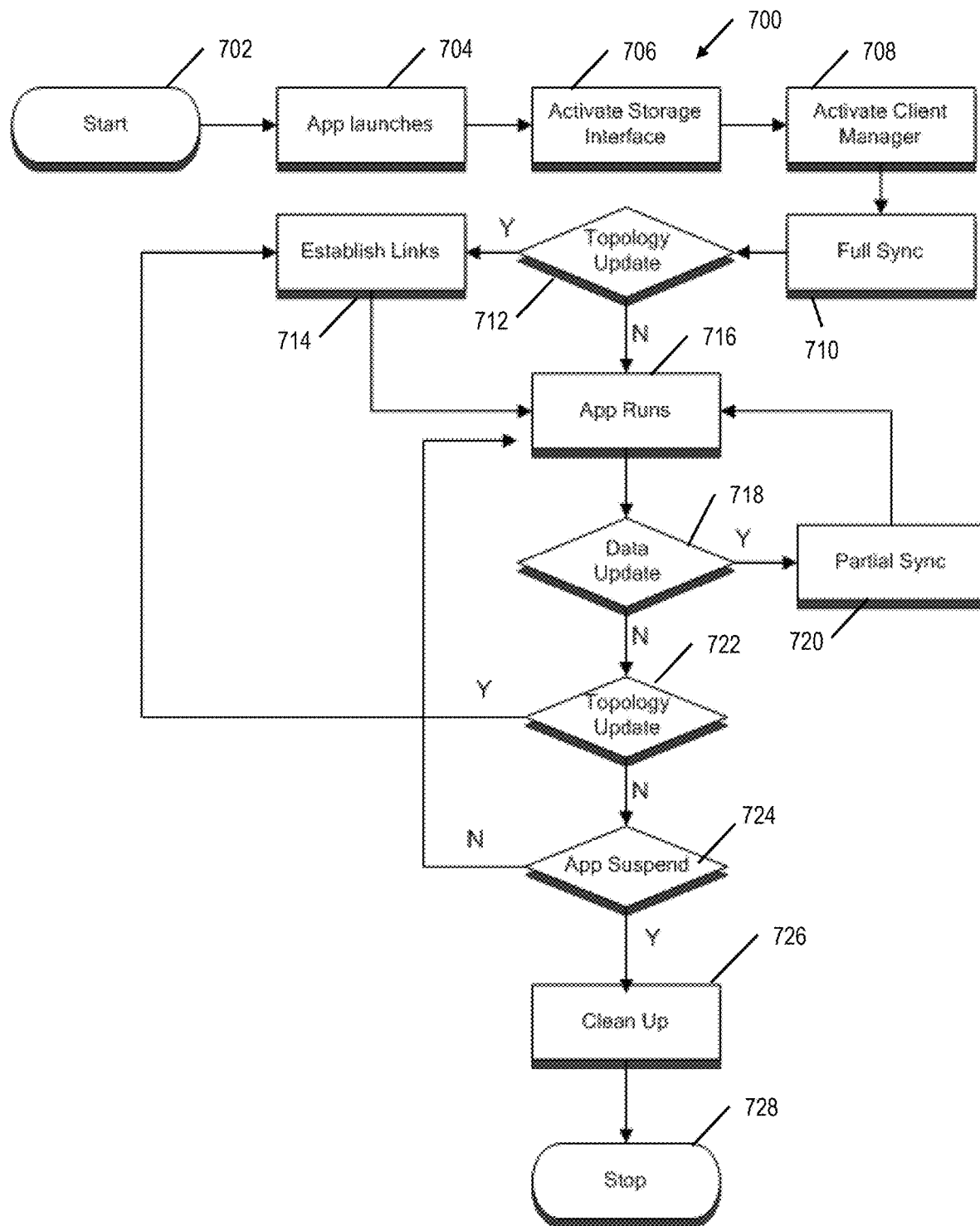
FIG. 7 shows a client-side perspective of interaction with the replication optimizer of FIG. 6, in accordance with an exemplary embodiment.

FIG. 7 provides a flow chart 700 which illustrates how a client, such as Mobile A 502 in FIG. 5, keeps the governed directory synchronized, and communicates topology changes to optimize the replication strategy. Processing begins at 702. In step 704, a mobile app launches, which causes the Storage Interface and the Client Manager to initialize in steps 706 and 708. In these steps, the Storage Interface and the Client Manager establish a connection to the cloud and may perform authentication. Once this is done, in step 710, the Client Manager initiates a full synchronization with the cloud to receive all the latest data. It then receives information about the current topology of online peers who are sharing the same data through linked governed directories. If the topology has changed, as in the "YES" branch of decision block 712, e.g. this new client wants to join, the Client Manager communicates with the Replication Optimizer and nearby peer devices to establish links in step 714. For example the client may establish a Bluetooth link to a nearby device. It will also receive a replication plan (if the implementation requires the client to locally cache the plan).

Once the links are established (if needed), the application can run normally in step 716 (reached directly via "NO" branch of block 712 if no topology update). The Client Manager transparently monitors the condition of the governed directory to detect data updates in step 718 or requests to shut down or suspend the app. Note that data updates can originate from the client itself, i.e. the mobile app changes the data, or the data update can originate from a message received from the Replication Optimizer. If the data update is local, the no action needs to take place other than to inform the Replication Manager of the update. If the data update originates remotely, then the device must do a partial sync 720 by following the "YES" branch of decision block 718, where it only needs to make the changed data item consistent. This may involve receiving updates from the server, or consulting a peer for updates. The action is based on the replication plan it received when the topology was updated, or through a plan implemented by the Replication Optimizer. Control flows back to step 716. In the absence of a data update in block 718 ("NO" branch), flow proceeds to decision block 722.

If the topology changes at any time, as per decision block 722 "YES" branch, the device can communicate this to the Replication Optimizer, which may then shuffle how the devices are linked in step 714, and send a new replication plan. Otherwise flow proceeds to decision block 724 via the "NO" branch of block 722. If the application suspends or quits as per the "YES" branch of block 724, one or more embodiments perform various clean up routines 726 to disband connections to the storage provider and Replication Optimizer. Processing stops at 728. The "NO" branch of block 724 proceeds back to step 716.

Figure 8:
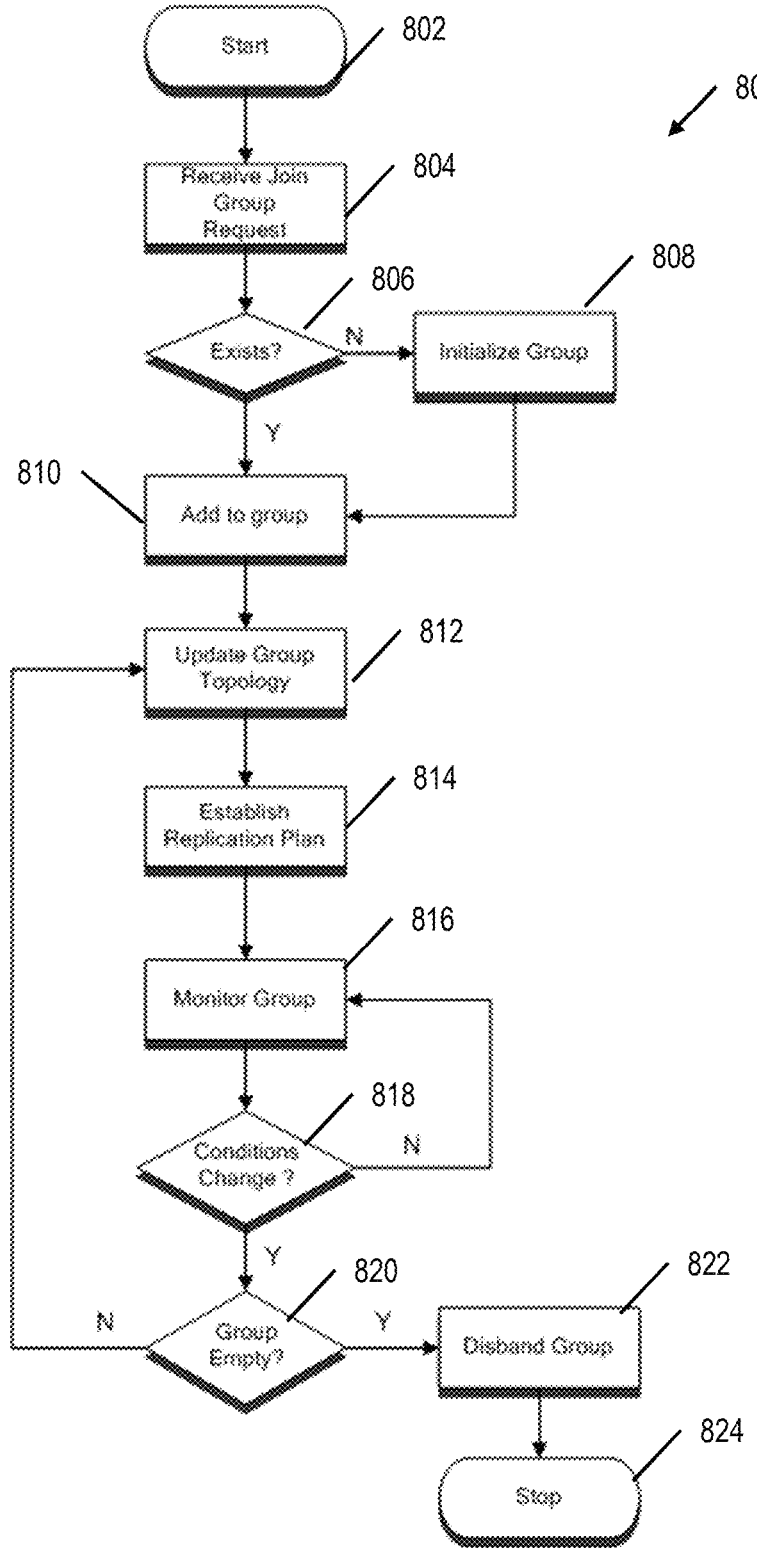
FIG. 8 shows device interaction with the replication optimizer of FIG. 6, from the perspective of the replication optimizer of FIG. 6, in accordance with an exemplary embodiment.

FIG. 8 provides a flow chart 800 which illustrates the steps the Replication Optimizer takes to manage the governed directories. Processing begins at 802. In step 804, a device sends a request to join a group identified by the common key (e.g. app ID and user ID). If the group does not exist, as per the "NO" branch of decision block 806, the Replication Optimizer initializes the group in step 808 and registers the device as a member of the group, in group registry 602. If the group already exists, as per the "YES" branch of decision block 806, the device is added to the existing group, in group registry 602.

Adding a new device triggers an update to the group topology in step 812. The Replication Optimizer calculates a new replication plan and communicates this to members of the group, as indicated in step 814. It then monitors the group in step 816, through the messages received from each device's Client Manager. If the conditions of the topology change, as per the "YES" branch of decision block 818 (such as a group member leaves or switches its network connection to another medium), the Replication Optimizer updates the group topology in step 812 (assuming the group is not empty, i.e., "NO" branch of decision block 820) and re-calculates a new replication plan. It sends this new plan to the remaining group members. Otherwise ("NO" branch of block 818) monitoring continues.

If the last member of a group leaves ("YES" branch of decision block 820), the Replication Optimizer can tear down the group in step 822 and recover any resources freed by the group tear down. Processing stops at 824.

One or more embodiments advantageously focus on providing application-level component connectors that facilitate the setup of devices as candidates for executing omnichannel application components. One or more embodiments advantageously provide specific, standardized components that allow such connections across vendor ecosystems, application-types, and devices types; a cloud component to dynamically adapt the connections between devices due to topology and quality of service changes; and/or a replication manager that allows devices to replicate data, even one that is not used by any particular application, to prevent data loss.

One or more embodiments coordinate links between nearby devices to form an omnichannel application.

One or more embodiments are concerned with managing data replicas, and one or more embodiments allow multiple devices beyond one handset and one PC to contain replicas; and/or address the creation of replicas for preventing data loss.

Replication is one reason why devices might connect; however, one or more embodiments are not dependent on a relational database management system (RDMBS). Indeed, one or more embodiments do not even require that a database be installed on the device. Instead, one or more embodiments allow devices to link together as "candidate" resources for various multi-device applications and provide low-level replication as a redundancy mechanism to enable data sharing and prevent data loss. This is more general than DBMS replication which focuses on log- or state-based mechanisms for synchronization, as well as managing conflicts in data replicas that may have diverged. One or more embodiments focus on linking devices together to execute applications of which data replication is one subset.

Thus, one or more embodiments provide a system for providing synchronization of applications across different devices, including a middleware application handling component for obtaining a directory (governed directory abstraction) for an application and dynamically determining a strategy for synchronization of the application across different devices (even if using different platforms). In some embodiments, the application handling component is a cloud-based application handling component. In some embodiments, the application handling component dynamically determines a synchronization strategy factoring in at least one variable (e.g., device battery life, network availability, device location, device data plan, type of data, etc.). In some embodiments, the application handling component additionally provides security/authentication, provenance and communications. Some embodiments further include client-side components (endpoint bindings) for different mobile devices. In some embodiments, the application handling component further includes a replication manager for creating replication policies for a running instance of an omnichannel application and for dynamically updating replication policies on participating devices.

Furthermore, in one or more embodiments, a method for providing synchronization of applications across different devices includes a middleware application handling component obtaining a directory (governed directory abstraction) for an application and dynamically determining a strategy for synchronization of the application across different devices (even if using different platforms). In some embodiments, the application handling component additionally provides security/authentication, provenance and communications. Some embodiments further include creating replication policies for a running instance of an omnichannel application and for dynamically updating replication policies on participating devices.

Advanced Split Screen Support

Running a mobile application on multiple devices is now the rule and not the exception. Users expect the same application to be available on their smart phones, tablets, and desktop computers. To enable more efficient execution of an application, one or more embodiments allow the construction, monitoring, and optimization of running application components on mobile devices. Using a transparent instrumentation method, applications communicate with an application optimizer that provides plans for application component placement on devices, as well as optimized network communication between the devices and a cloud-based service.

Again, running a mobile application on multiple devices is now the rule and not the exception. Users commonly have multiple devices that may come from a variety of vendors. For many popular mobile apps, users expect a version of that app to be available on all of their smart phones, tablets, laptops, and desktop computers. As a user's devices become more varied, for example with the advent of mainstream wearable computing like smart watches and smart glasses, the user will expect the application to seamlessly run across devices in a manner that is both seamless and efficient.

For example, a movie service may create an application that allows the user to download a movie onto a smart phone, which then streams it to the user's smart glasses for viewing. In this case, the application will have concurrent execution of components on both the smart phone and glasses. In creating such an application, the coordinating of the operation of the application is a difficult process. The devices that may host application components will have a variety of different capabilities (which can differ by orders of magnitude) and executing the application must be judicious about the resources the application consumes during its operation.

As a simplified example, imagine the aforementioned movie app. Assuming that the application can be broken down into three components (a movie downloader, a movie streamer, and a video player), there are a variety of choices regarding how this application can be executed on a smart phone and glasses. In one case, all the components can be executed on the smart phone and the user just views the movie on the smaller screen. In another case, the video player can execute on the glasses, and accept the playback stream from the smartphone, which also runs the movie downloader. Yet another case is that all the components could be run on the glasses without using the smartphone at all. In general, given the variety of options an application has to run on a user's devices, determining the best overall strategy can be difficult. Compounding this difficulty is that the available devices and their capabilities are dynamic and will be dependent on many environmental conditions and user intentions.

Prior work in distributed computing, mobile agents, and cyber foraging has looked at creating applications where parts of that application can be offloaded to other devices and/or cloud services with the focus on maximizing performance; for example a voice translation application will do the heavy computation in the cloud while the mobile device mainly runs a user interface. More recent work has looked at automated partitioning of an application and offloading parts of it for the purpose of saving energy.

One or more embodiments focus on using multiple devices to efficiently provide a seamless user experience. One or more embodiments provide a cohesive way for a collection of devices to act as a single application platform for a user; this platform will typically have to interact and exchange data with outside cloud data services. One or more embodiments keep track of data "sinks" and "sources" within a running application; unlike prior art, one or more embodiments optimize the flow of information between the devices based on a sink and source map in order to reduce redundant data retrievals. This differs from previous work in split screen applications, which mainly focus on enabling devices to connect to external displays or share display resources and do not consider resource usage.

Figure 9:
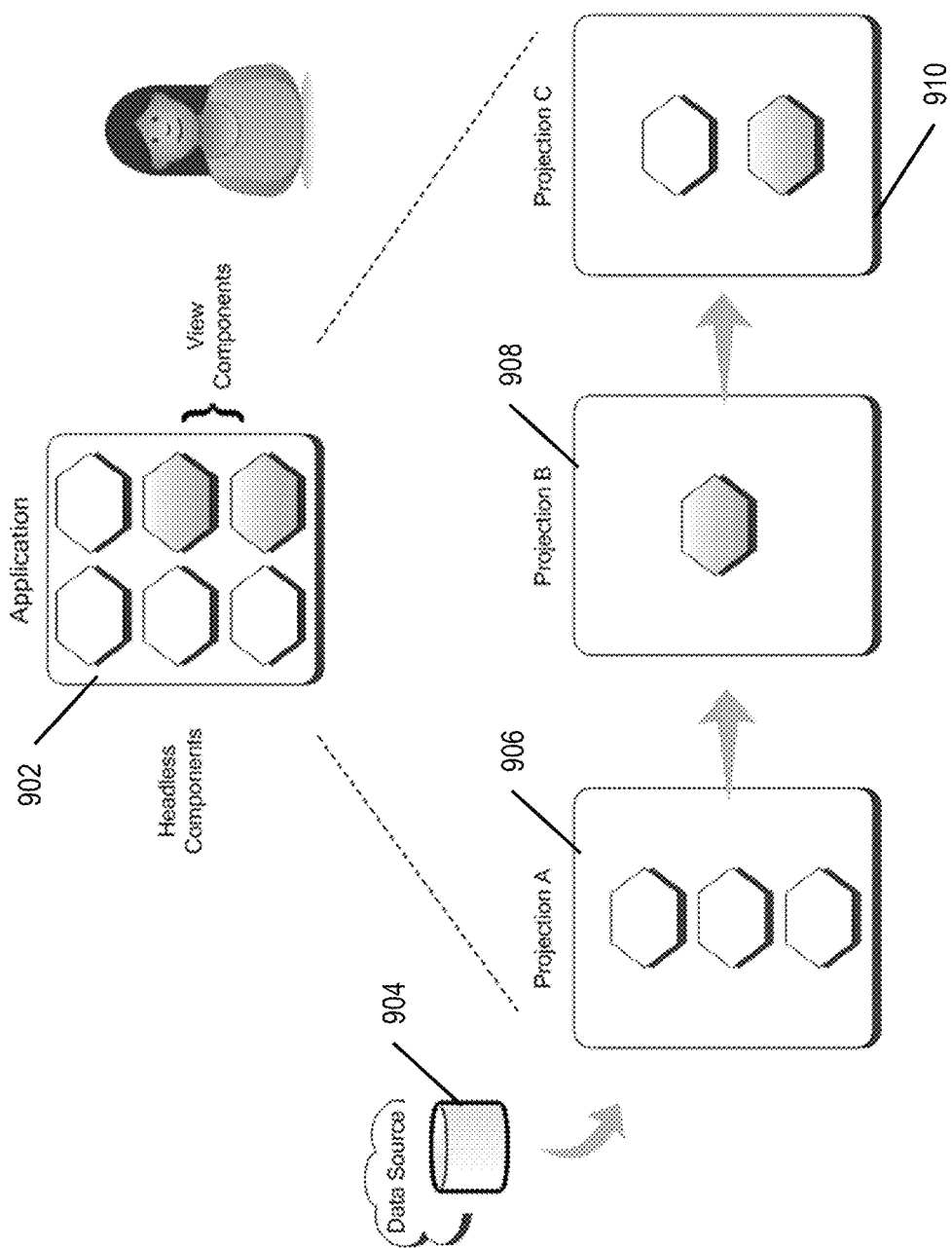
FIG. 9 shows an embodiment which enables an application to be efficiently run across multiple devices.

FIG. 9 shows an overview of how one or more embodiments can be used to enable an application to be efficiently run across multiple devices. In FIG. 9, a single application 902 is made up of multiple application components. These components can be categorized as headless, meaning they do not directly interact with the user through a user interface (UI) view, and View Components (shaded), which provide a UI view that is rendered on a screen and interacts directly with the user.

In FIG. 9, the user has three devices, which are available to instantiate and run different, non-overlapping components from the application. Using a projection plan, one or more embodiments decide which components should execute on each device. In FIG. 9, Projection A 906 runs three headless components, Projection B 908 runs a single view, which is the device the user focuses on, and Projection C 910 runs a headless component and a view, which the user may interact with but is not considered the primary view. An example of such a situation would be a movie viewing application, where the user focuses on Projection B 908 as the main screen, has a smart TV box downloading and decoding video on Projection A 906, and has a tablet as a second screen to synchronize and display relevant content to the movie shown in projection B.

In the previous example, all devices running application components communicate over a network and may have direct access to the external data source 904, e.g. the movie service. However, given the different energy capabilities of the devices, it does not make sense for each device to communicate directly with the data source, especially if the devices will be sharing. In FIG. 9, one or more embodiments set up a data flow where the components on Projection A 906 download the data first, then send the appropriate data to Projection B 908, which uses it to render the view. Simultaneously, Projection B 908 generates and sends data to Projection C 910. This data may include information received from Projection A. As neither Projection B nor Projection C interacts directly with the external data source 904, they can preserve their local resources, reduce contention for shared network services, and reduce the load on the external data source. At the same time, the data flow provides a low-latency setup such that the view on Projection B and C get data in a timely manner.

Figure 10:
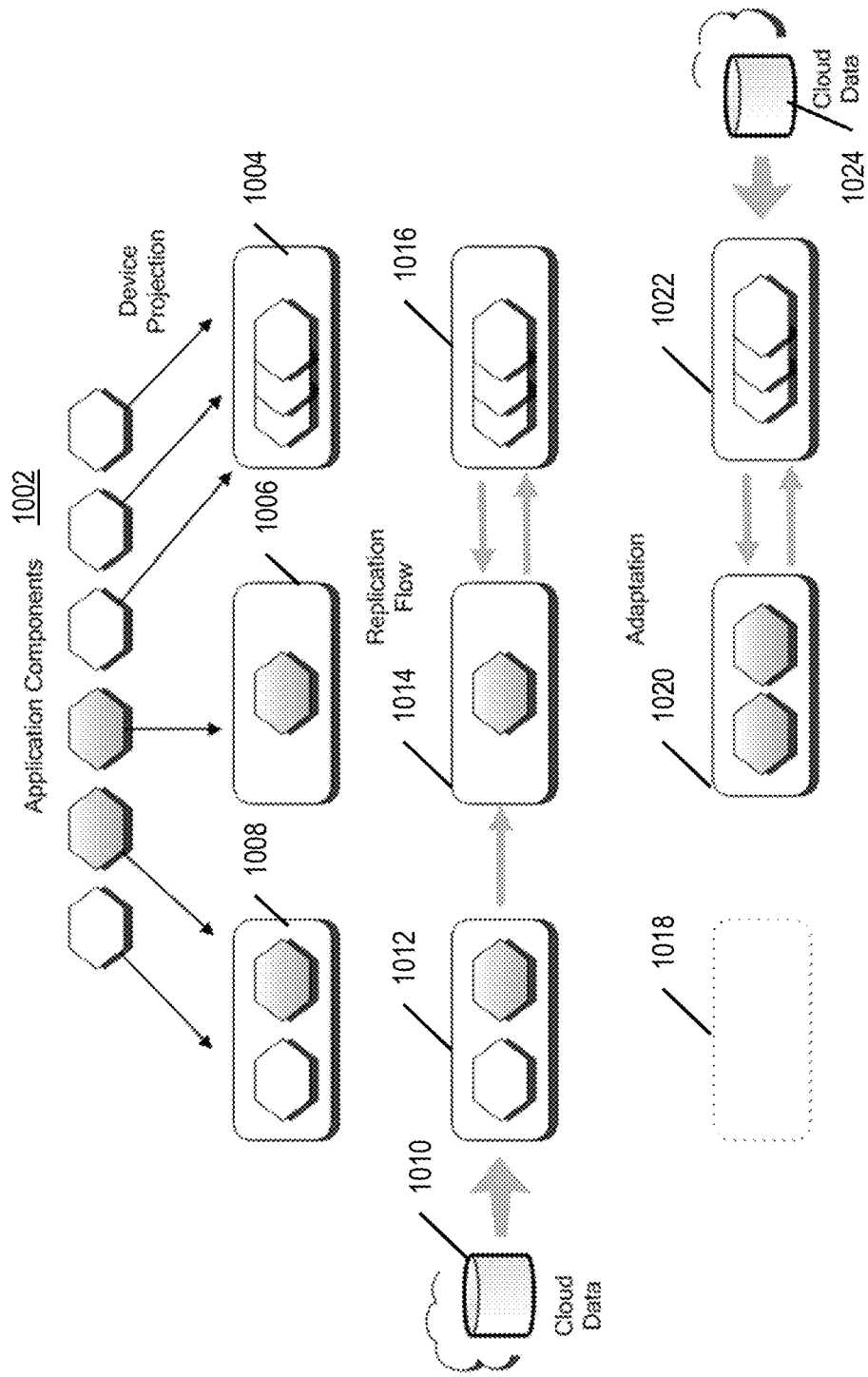
FIG. 10 depicts an exemplary embodiment of a mechanism for calculating component placement and date flows between components, in connection with the embodiment of FIG. 9.

FIG. 10 illustrates the mechanism for calculating the component placement and data flows between them. At the top of the figure, application components 1002 (e.g., components of application 902) are organized into a graph, which describes how data needs to flow between them. Creating such a graph can be done manually by a developer or produced using a combination of developer hints, static analysis, and runtime analysis techniques. Headless components usually process data that is used to power view components. One or more embodiments place view components "close" to the headless components that provide them data when possible. Once the application components are organized, one or more embodiments create a component placement strategy, which projects the application components onto the available devices. In the example of FIG. 10, the first two application components are placed on device 1008; the next on device 1006, and the final three on device 1004. The selection of the devices is based on the user intent (such as desiring a large display for video) as well as the connectivity of each device to each other and to the internet. Once the placement is done, one or more embodiments create a replication flow strategy which dictates how the devices should link to each other, and what data should flow between the devices. The objective here is to reduce redundant communications, reduce the latency of data replication, and optimize the overall device resources hosting the application. In the non-limiting example of FIG. 10, device 1012 communicates directly with cloud data 1010, and passes required information to device 1014 which in turn interacts with device 1016. Please note devices 1008, 1012, 1018 may be the same device; devices 1006, 1014, 1020 may be the same device; and devices 1018, 1020, 1022 may be the same device; different numbers are used in each row for precision.

Furthermore, cloud data 1010, 1024 may be the same; again, different numbers are used in each row for precision.

Mobile environments are very dynamic and the system must adapt to changes. In the final step, one or more embodiments monitor the running application. Should a device 1018 leave the application, e.g. runs out of energy, user decides to turn it off, the system can react to this by repeating the above calculations for component placement and replication flows based on the new device topology. This adaptation continues until no such strategy exists or the user decides to terminate the application. In the adaptation in this example, a view component from device 1018 migrates to device 1020, and device 1022 now communicates directly with cloud data 1024 and interacts with device 1020.

Figure 12:
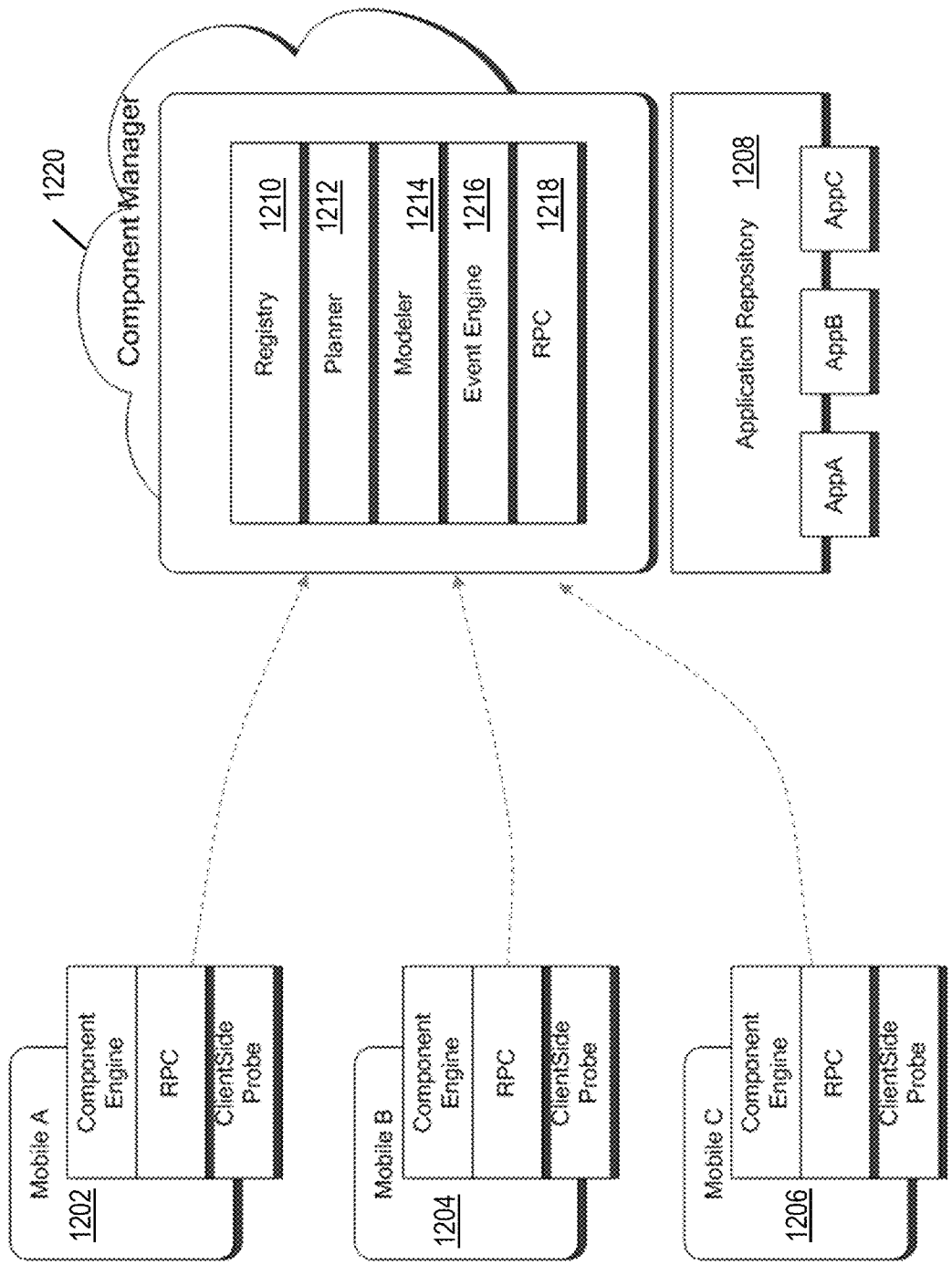
FIG. 12 shows a component manager, in accordance with an exemplary embodiment.

FIG. 12 shows an exemplary architecture of to enable the features of FIG. 10. In FIG. 12, client-side components on devices 1202, 1204, 1206 are transparently added to applications to allow the execution of components on each device. This code could be pre-installed on the device for use by many applications or it can be transparently added to the application using program analysis and code injection techniques. The client side includes a probe (not separately numbered to avoid clutter), which monitors the state of the device such as network connections, CPU load, application usage, and can report these statistics to the server component using a remote procedure call (RPC) component (not separately numbered to avoid clutter). In one implementation, the user can manually activate the probe to report device availability and conditions when the user wants to run a particular application. One or more embodiments do not assume this probe is always running.

The RPC component can use a variety of protocols such as HTTP to communicate with the server (e.g., on which component manager 1220 resides) or with other devices. Finally, the component engine can host application components and execute them. One or more embodiments assume that each application will have a copy of a component that may be tailored for specific applications. One or more embodiments assume no standardization other than the ability to accept and execute components, and conforming to a messaging protocol with the server. One or more embodiments also assume that the RPC mechanism can be contacted in the background to respond to messages from the Component Manager 1220.

Component Manager 1220 is responsible for creating the application projection plans and dictating how the data should flow among the devices executing an application. In FIG. 12, the cloud component maintains an application registry 1210, which describes the application components (headless and views) and specifies how each application component depends on each other and what data needs to be exchanged.

The user can launch an application, by selecting it on a device. Rather than launch all components on that device however, the user can request to run it in multi-device mode. In this mode, the client component engine calls the Component Manager 1220 and requests the instantiation of the application across available devices. The Component Manager receives the request and retrieves any information it has about the user's available devices for running the selected application. This information may already be available if the client-side probes have recently sent data; otherwise the Component Manager may wait for a period of time before the creating a plan.

The Component Manager 1220 has an RPC component 1218, which interacts with the client-side components. It also has an event engine 1216, which processes messages from the client to create a model of the device topology. The Modeler component 1214 uses this model to interact with the Planner component 1212, which runs various algorithms to determine the placement of components on devices in the model, as well as the data flows that should exist between the components. For example, the Planner can run an iterative search algorithm to determine the lowest cost path between all sources and sinks to create the data flow plan. In general, these algorithms are tractable given the small search size.

In an exemplary embodiment, application repository 1208 is a data store. Functionality of RPC 1218 is discussed elsewhere herein. Event engine 1216 is a web application with storage accessible to it, to store information it collects. It correlates received events with each other. Modeler 1214 reads the data stored by the event engine, and creates higher-level interpretations of the data. For example, modeler 1214 reads the list of received events and creates a graph of the devices that are in communication with each other. Planner 1212 carries out optimization based on the graph or other models produced by the modeler. For example, if the data placement is to be optimized, planner 1212 may ensure that the omnichannel application is resilient to the loss of a device. Non-limiting optimization techniques include network algorithms to create minimum-cost and/or minimum-weight trees. Other alternatives include use of linear programming and/or operations research techniques to undertake cost optimization. Registry 1210 is a database registering devices and application components.

Figure 11:
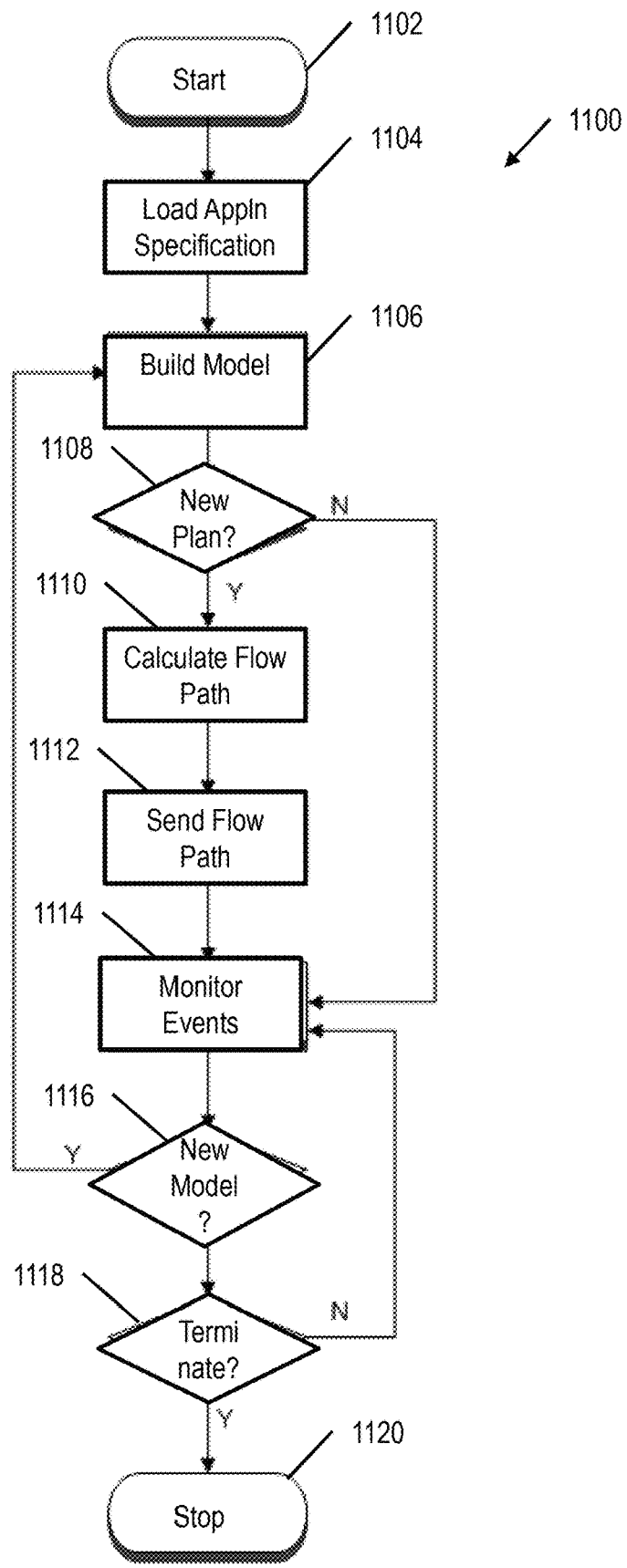
FIG. 11 shows device interaction with the component manager of FIG. 12, from the perspective of the component manager of FIG. 12, in accordance with an exemplary embodiment.

FIG. 11 provides a flow chart 1100 which illustrates the steps the Component Manager takes to create a component placement and data flow plan to the clients. Processing begins at 1102. In step 1104, the component manager loads an application specification of the desired application to be launched. Based on information received from the clients, in step 1106 it constructs a model of how the available devices are configured. If no plan is in place (i.e., new plan needed, "YES" branch of decision block 1108), the Component Manager calculates a new flow plan in step 1110 that says what components should be executed on each device and how they should send data to each other. In one or more embodiments, assume that clients can download application components from the application registry; alternatively the components can already be resident on the device. In step 1112, the Component Manager sends the flow plan to each device running the components. Once the application is running, the Component Manager keeps track of events received from the devices, in step 1114. Note that if a plan was in place (i.e., no new plan needed, "NO" branch of decision block 1108), processing proceeds directly to step 1114.

In decision block 1116, if the events monitored in step 1114 dictate that a new model is needed, as per the "YES" branch of block 1116, the Component Manager creates a new plan based on the aforementioned steps. If no new model is needed, as per the "NO" branch of block 1116, the Component Manager continues to monitor events. If the application terminates, as per the "YES" branch of decision block 1118, the Component Manager can clean up any unneeded state and stop monitoring for this application, in step 1120. Otherwise, as per the "NO" branch of decision block 1118, go back to step 1114 and continue monitoring.

Figure 13:
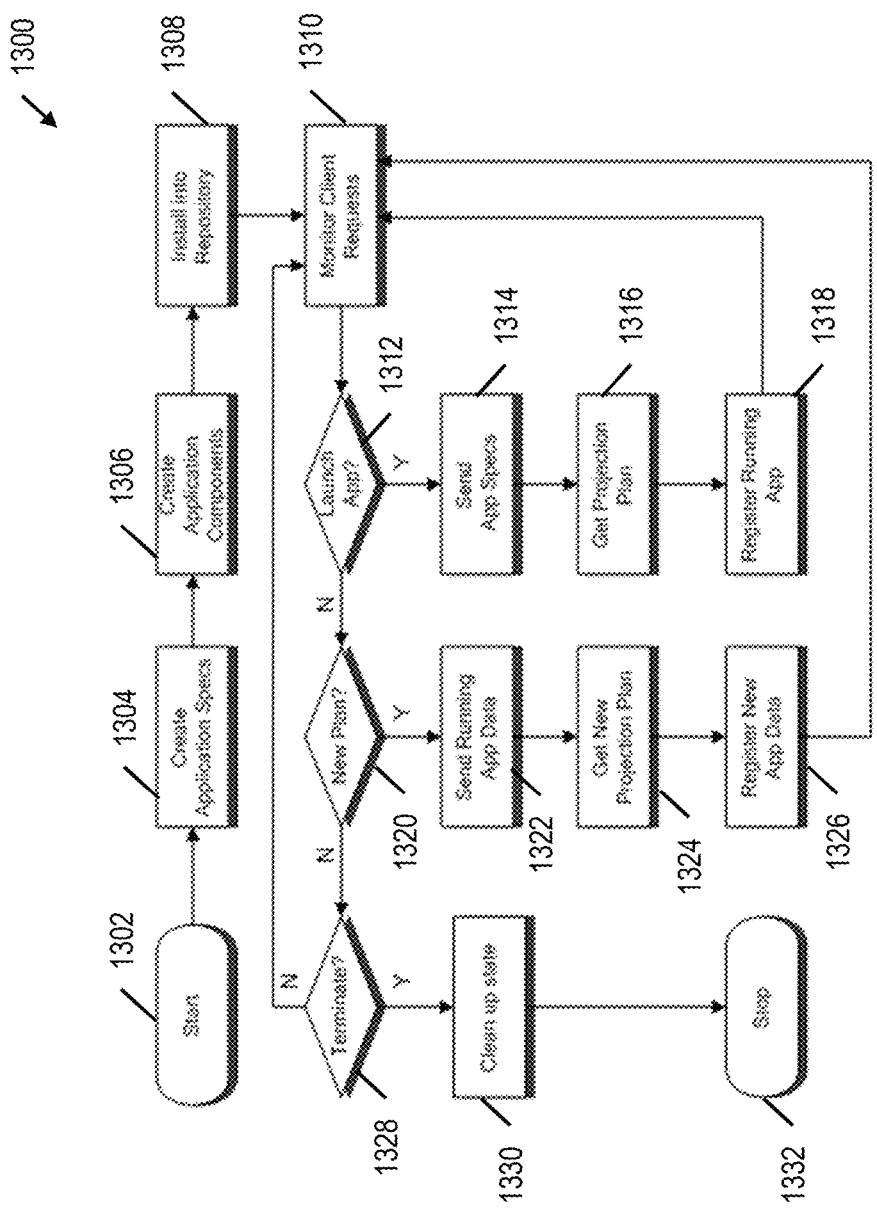
FIG. 13 shows a client-side perspective of interaction with the component manager of FIG. 12, in accordance with an exemplary embodiment.

FIG. 13 provides a flow chart 1300 which illustrates the steps the client-side performs. Processing begins at 1302. In step 1304, an application developer creates specifications of an application that describe the different components. Once these components are ready, as per step 1306, in step 1308, they can be installed into a repository 1208 such as an app store where clients can download them immediately, or wait till the user wishes to launch the application. At that point, the Component Manager monitors the client requests for application launch, in step 1310.

When the application is launched ("YES" branch of decision block 1312), the client sends any data the Component Manager needs to create a plan. This can include currently running applications, CPU load, wireless conditions, etc., as generally indicated in step 1314. It then gets the plan from the Component Manager in step 1316 and executes the necessary components. Other devices that will run other components do the same steps and will receive their instructions directly from the Component Manager. The running app is registered in step 1318.

Once the components are running ("NO" branch of decision block 1312), the devices may receive a command to await a new plan ("YES" branch of decision block 1320). The client can suspend executing its current components and send any state information to the Component Manager in step 1322 to help in constructing the new plan. It then gets the new plan in step 1324 and registers the new configuration it has installed to the Component Manager in step 1326. For example, the client may have to run additional components if another device leaves. Once it installs these components it tells the server what it has done so the Component Manager has the latest information.

Finally ("NO" branch of decision block 1320), the application can terminate ("YES" branch of decision block 1328), which may require the client to clean up various states in step 1330 before stopping at 1332. If not terminating, flow returns to step 1310.

Thus, in one or more embodiments, a technique for providing and running multi-device applications includes creating component placement and data flows to optimize the execution of the application(s) on the devices, and monitoring and executing application components. In some cases, the server-side middleware is a cloud-based application handling component. In some cases, the server-side middleware provides an application registry for storing and retrieving application specifications. In some cases, the server-side middleware provides event handling and modeling to create a model of available devices to run the application. In some embodiments, the server-side middleware provides a planning component that uses the model to create optimized component and data flow plans based at least on variables such as energy, reduced communication redundancy, and/or user interaction latency.

In some cases, the server-side middleware can dynamically update the plan based on new events received from the client. Some embodiments further include client-side components for different mobile devices. In some such embodiments, the client-side components can monitor device state. In some such embodiments, the client-side components can interact with the server-side middleware to update and receive plans. In some such embodiments, the client-side components can receive and execute application components.

Advanced Application Projection

Users commonly have multiple devices within arm's reach. Omnichannel applications are distributed applications that can run on a collection of devices, to share resources and utilize the complementary strengths of each. One or more embodiments provide a framework for enabling the construction of omnichannel applications by allowing a user's personal devices to configure themselves into omnichannel groups to collectively perform tasks for the users. One or more embodiments utilize a cloud-based mediator component that acts as an authenticator and manager for establishing omnichannel groups, and a minimal set of client-side components that allow the devices to establish links to each other in order to configure and launch different components in an omnichannel application.

Users commonly have multiple devices within arm's reach and routinely use a number of devices to perform tasks throughout the day. The user may use the devices sequentially; for example, a user may be out shopping and use a smartphone to compare online prices with that of an item he or she encounters in a store. He or she may defer purchase until later in the day when he or she is at a desktop computer, where he or she reads reviews of related items. Later, the user is reminded of the item when using his or her tablet, and decides to make the purchase at an online store. The user may also use the devices synchronously; for example, a user may be watching a live sports event on a smart television and decide to link his or her tablet to the broadcast as a "second screen." During the game, the user can see additional, related content about the sports event on his or her tablet. He or she may even be able to use the tablet as a remote control and call up alternate camera angles that can be displayed on his or her smart television.

In both cases, the user desires a seamless experience where the devices work fluidly with each other to perform the tasks required by the user. At a fundamental level, this requires applications to have the ability to seamlessly share data and instructions across devices, and be reactive to non-deterministic inputs from the user or the environment. This requires at the lowest level, the ability to establish relationships between devices such that data and instructions can be synchronized across them in a coherent manner. One or more embodiments provide a framework that allows developers to easily construct omnichannel applications using cloud and client-side middleware that can configure a set of devices to work in a cohesive manner. Rather than viewing a user's personal devices as a disparate set of mismatched components, one or more embodiments view the devices as a cohesive unit that can share resources and leverage the complementary strengths of each.

Figure 14:
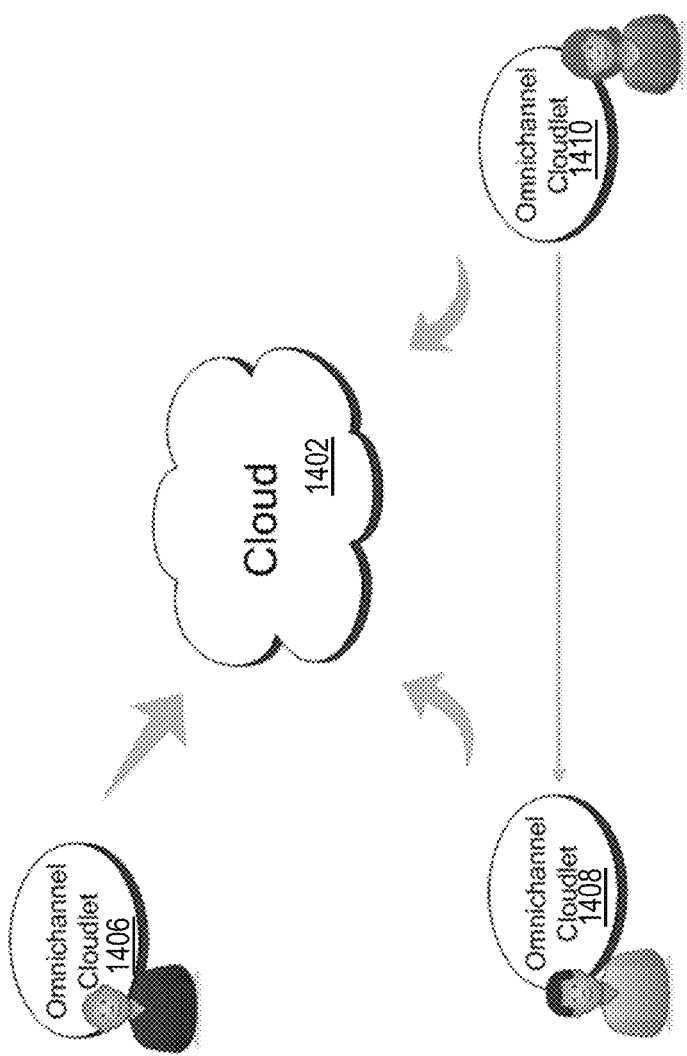
FIG. 14 shows resource sharing via an omnichannel cloudlet approach, in accordance with an exemplary embodiment.

FIG. 14 shows this view. In FIG. 14, the cloud 1402 hosts different services a user can access. Instead of each of the users' devices accessing the cloud independently, one or more embodiments view the devices as an omnichannel cloudlet 1406, 1408, 1410, which performs tasks on behalf of the user. Communication to and from the cloud is done with the omnichannel cloudlet as the endpoint, not the individual device.

Figure 15:
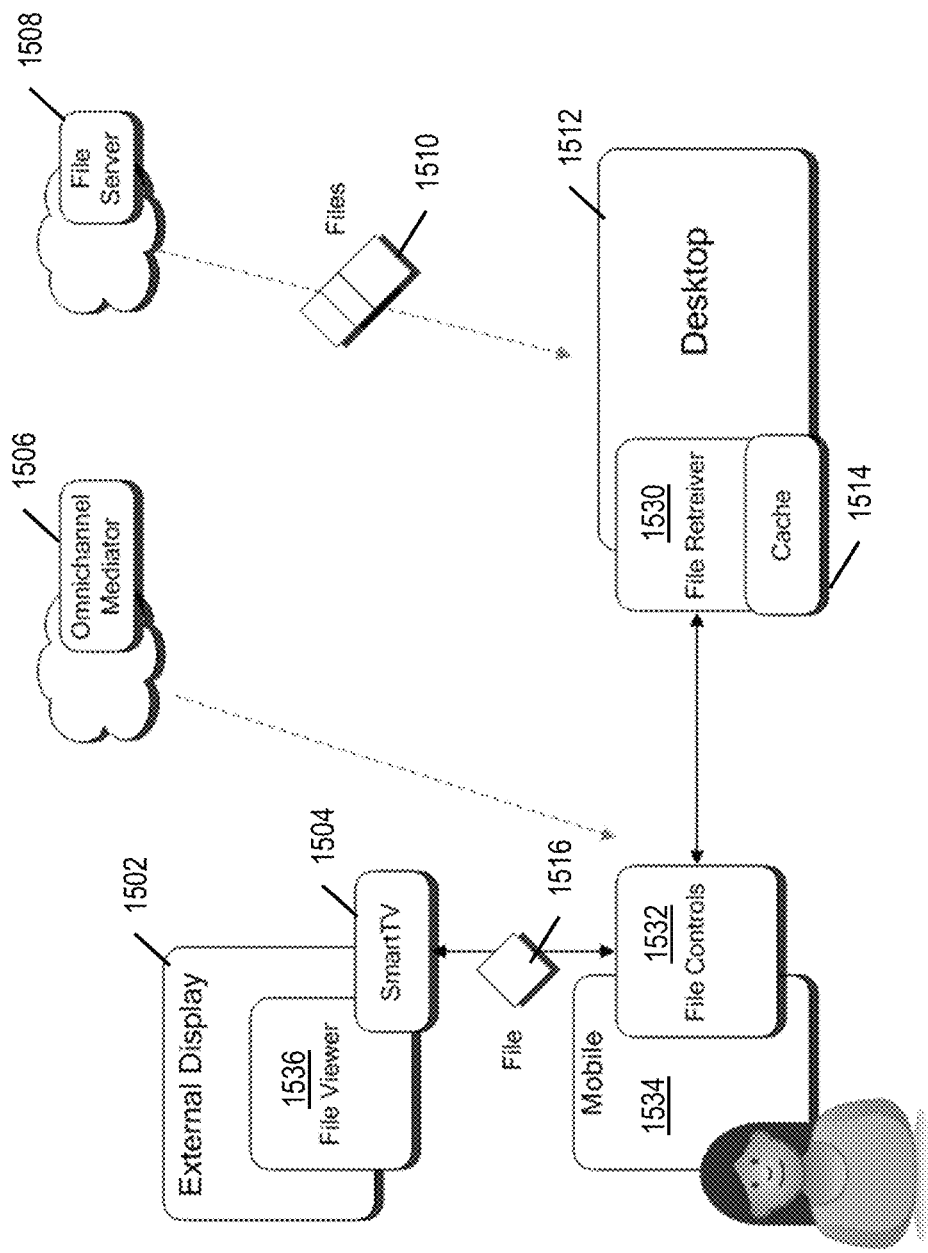
FIG. 15 shows an exemplary embodiment of a three-component omnichannel cloudlet.

Omnichannel cloudlets can be advantageous in many ways. FIG. 15 shows one scenario where an omnichannel cloudlet is formed from three devices: desktop computer 1512, smartphone 1534, and a smart TV box 1504 connected to a large television 1502. In the figure, the user wishes to view photographs on the large display 1502 and has his or her mobile phone 1534 in hand. Rather than view the file on a single device, he or she uses an omnichannel file viewing application, which has three components: file retriever 1530, file controller 1532, and file viewer 1536. Each of these components is located on one of the devices in his or her omnichannel cloudlet. He or she launches the app on her phone 1534, which connects to the omnichannel mediator 1506 to authorize and configure an omnichannel application. Through this process, the user's mobile phone is able to link and request the execution of file viewing components on the desktop computer 1512 and the smart TV box 1504. During execution, the desktop 1512 uses its fast Ethernet connection to download and locally cache photos from an online file server 1508. The photo files are seen in transit at 1510 and the cache is at 1514. The user's mobile phone 1534 retrieves the photos from the desktop computer 1512 wirelessly, and forwards them wirelessly to the smart TV box 1504; the photo files in transit are seen at 1516. The box 1504 is running a file viewer 1536, which can accept photos from the mobile phone and display them on the external display 1502. In this example, the file viewing app is really an omnichannel application which has distributed its components across the user's personal devices. At the lowest level, these components are linked to each other to share data and instructions (commands). One or more embodiments address this need and provide a framework to allow such sharing and configuration to take place.

Figure 16:
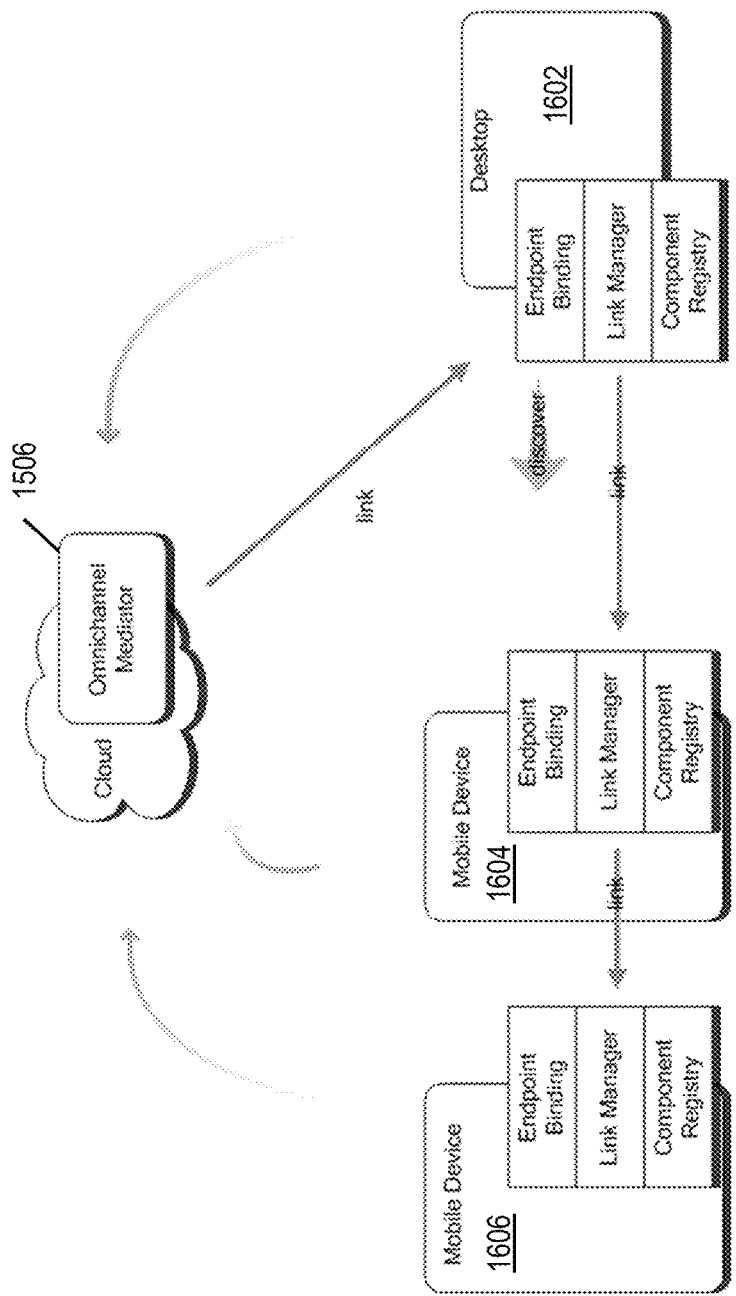
FIG. 16 shows exemplary server- and client-side components of an embodiment related to omnichannel cloudlets.

FIG. 16 shows the server-side and client-side components of one or more embodiments. In FIG. 16, the cloud hosts an Omnichannel Mediator component 1506, which is responsible for the authentication, authorization, and configuration of omnichannel cloudlets made up of a user's personal devices. The figure depicts three devices that can potentially form an omnichannel cloudlet. The devices include two mobile devices 1604 and 1606, such as a tablet and a smartphone, and a desktop class computer 1602.

Each device has a minimal set of client-side software components to enable cloudlet formation. The endpoint binding component (not separately numbered to avoid clutter) is responsible for accessing platform-specific functions and can connect to different input channels that the device may have. The endpoint binding provides a common entry point for different platforms and devices, which allows the omnichannel cloudlet to form on devices of different vendors. The endpoint binding can be a user-facing component that the user can use to configure the execution of running omnichannel applications. The endpoint binding runs a listening service that can be connected to different network interfaces on the device. The listening service is responsible for responding to requests from other devices of the Omnichannel Mediator. In the photo example, the Smart TV endpoint binding will receive requests from the smart phone over Wi-Fi to establish a link to share photo data and remote control commands originating from the smart phone.

The endpoint manager is also responsible for monitoring the omnichannel cloudlet during the execution of an application and reporting back to the Omnichannel Mediator 1506. This allows the omnichannel cloudlet to be reactive to changes in device topology or operating conditions. For example, in the photo viewing scenario, the Wi-Fi connection between the desktop and the smart phone may suddenly break. The smartphone can inform the Omnichannel Mediator, which can then instruct the desktop and smartphone to establish a communication link using Bluetooth instead.

The Link Manager in FIG. 16 (not separately numbered to avoid clutter) is responsible for opening and maintaining communication links to other devices in the omnichannel cloudlet. It will receive instructions from the endpoint binding, which in turn is receiving instructions from the Omnichannel Mediator, as to which devices to link to and how that link should be maintained. Again, resorting to the photo example, the Omnichannel Mediator will instruct the desktop computer to link to a file server in the cloud over Ethernet and use a File Retriever component to download and cache files from that server. The smart phone will establish a link with the desktop computer over Wi-Fi to access the File Retriever component and access files that are locally cached on the desktop. Finally, the smartphone will establish a link, also over Wi-Fi, to the smart TV box to send photos and remote control commands.

The Component Registry (not separately numbered to avoid clutter) is responsible for keeping track of different application components and launching the appropriate components during the cloudlet formation. The component registry can be thought of as a registry of building blocks that can be used to perform a task. In the photo example, the component registry on each device knows that it has a single component from the file viewing app. During cloudlet formation, the component registry will receive a command to launch its component of the file viewing application and prepare to receive instructions or data over the communication link established by the link manager.

Figure 17:
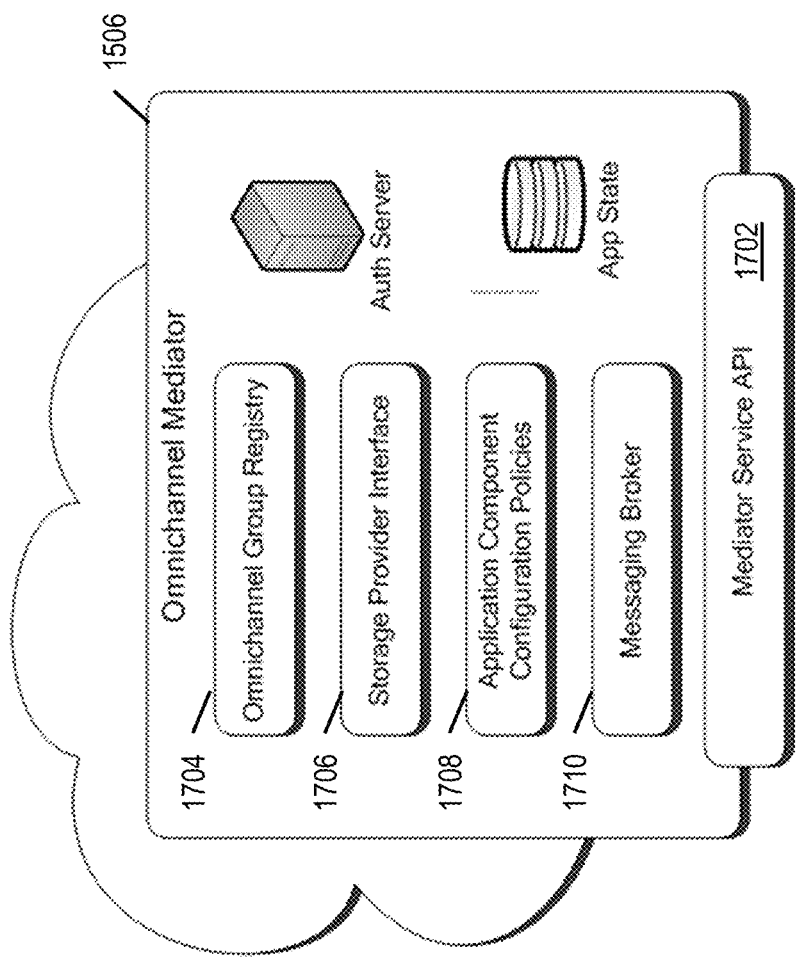
FIG. 17 shows an omnichannel mediator, in accordance with an exemplary embodiment.

FIG. 17 depicts the components that make up the Omnichannel Mediator 1506. The mediator is responsible for providing instructions to the devices on how to form an omnichannel cloudlet for a given application. As a network-based component, the mediator provides a service application program interface (API) 1702 that the devices can call to authenticate, authorize, and configure instructions. The mediator includes a messaging broker service 1710 since it is likely that the mediator may need to send messages to the devices in an omnichannel cloudlet. Each device in the cloudlet registers to receive messages that are relevant to its operations.

The mediator keeps a set of application configuration policies 1708 that tells devices how they should configure themselves for given topology of devices and operation conditions. One or more embodiments assume that these configuration policies are calculated offline and are stored at 1708. During the formation of the omnichannel cloudlet, the application configuration policy will dictate the set of instructions each device will receive to form the cloudlet. To dynamically adapt to changes in the omnichannel cloudlet, the policies also contain instructions on how to adapt to changes with minimal disruption to a running application. For example, switching the smartphone to use Bluetooth to communicate with the desktop computer does not impact the connection to the smart TV box (assuming the Wi-Fi connection between the two still works).

The Mediator 1506 may require access to storage providers to store some of its information (such as policies), as well as shared application state for running applications in an omnichannel cloudlet. The Storage Provider Interface 1706 can be used to plug in multiple storage providers for this purpose. For example, the Mediator may store files needed by a file sharing application—it can use an inexpensive object store to do this, or use a more expensive but higher capability database instead. The Storage Provider interface makes the process of using varying storage providers more flexible.

The Omnichannel Group Registry 1704 keeps track of devices, applications IDs, and user IDs needed to authenticate and authorize the formation of omnichannel applications. Random, untrusted devices cannot be used to run application components. Instead, users specify the personal devices they own that can be used for different omnichannel applications. This Group Registry acts as the bookkeeper of this information. During authentication, the mediator will consult with the group registry to confirm that a device with a certain ID is allowed to join an omnichannel group running an application with a certain ID. Note that authentication credentials can be stored on the device and communicated to the mediator in a number of ways, e.g. using the OAuth open standard for authorization, or some other suitable authentication protocol. Alternatively, the user may be prompted by the device to join the omnichannel group using a username and password (or some other form of authentication credential).

In a non-limiting example, application component configuration policies element 1708 is a database with plans contained therein. In some instances, the plans are produced by the above-discussed optimizer. The plans could also be prepared by human subject matter experts. Storage provider interface 1706 is provided because material stored in the cloud may not be collocated in the cloud with the mediator 1506. In some instances, storage provider interface 1706 is implemented as device driver code for the remotely located data store. Omnichannel group registry 1704 is a secure database including active identification keys (i.e., identification keys for active omnichannel applications). Messaging broker 1710 in one or more embodiments is similar to the event module described elsewhere herein. Mediator service API 1702 is an API for the synchronization service described elsewhere herein.

Figure 18:
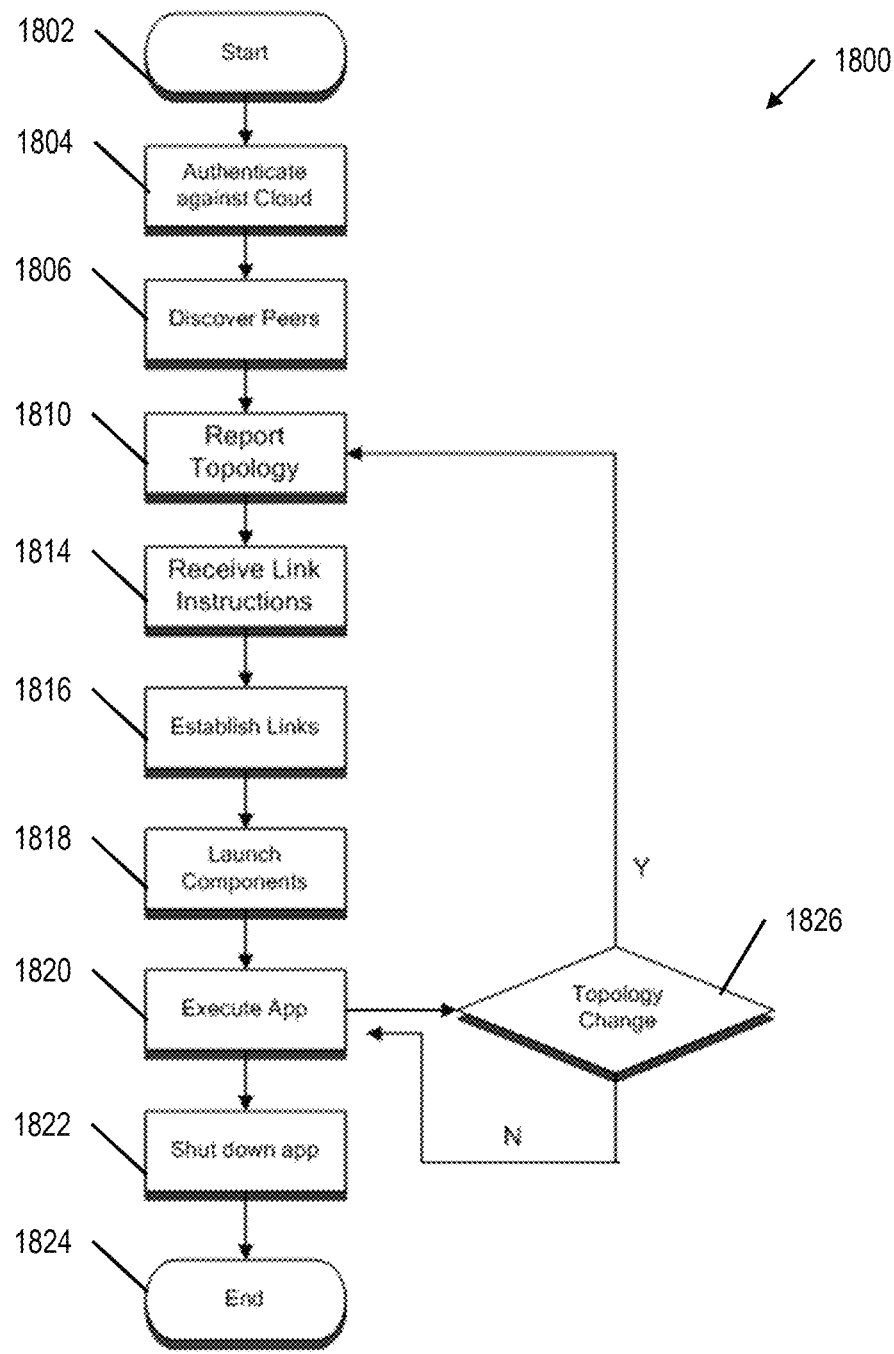
FIG. 18 shows a method for omnichannel mediator-device interaction, in accordance with an exemplary embodiment.

FIG. 18 provides a flow chart 1800 which illustrates the basic steps required by a single device to join and participate in an omnichannel cloudlet to execute an application. Processing begins at 1802. In step 1804, the device authenticates with the mediator by providing some form of credential as described previously. The mediator authorizes the device and may send it an authorization token, which the device uses to securely communicate with its peers in the omnichannel cloudlet. The mediator will also send instructions on which potential peers it should link to if those peers are already formed into a cloudlet. Alternatively, the mediator may send instructions for the device to initiate the formation of a cloudlet.

In step 1806, the device queries its available communication channels to find devices to form the cloudlet. If one is already formed and the device just needs to be added, it will look for specific devices on specific channels as instructed by the mediator. If the cloudlet is just forming, the device may use a discovery protocol to query for nearby devices—for example it may use BLUETOOTH (registered certification mark of BLUETOOTH SIG, INC. Kirkland, Wash., USA) or zero-configuration networking (i.e. Bonjour) to discover devices that are a short distance away. If the device discovers a candidate peer to connect to, it will register this device, and potentially its location, and continue to search for peers. Eventually, the device will end the search.

In step 1810, one or more candidate devices found in the previous step will report the perceived topology of candidate peers to the mediator, as well as other operating considerations such as "smartphone is on LTE," or "desktop CPU is 60%." The mediator will then search for the appropriate policy for configuring the omnichannel cloudlet and then send the instructions to one or more candidate devices in the cloud.

The device will receive link instructions in step 1814. The link instructions will contain information as to the location of the device, what channel to use to connect (such as Wi-Fi (registered certification mark of Wi-Fi Alliance, Austin Tex., USA) or Bluetooth), and other considerations (such as, the device may need several retries to establish a connection).

In step 1816, the device will establish the appropriate links. Note that it is not necessary for all the devices to be completely connected to each other. Instead, each device only needs to connect to a peer device that it needs to send and receive data from. This is determined by the policies of the mediator.

Once the devices are linked, in step 1818, they launch the necessary components to run the application. For example, the smart phone in the photo example will launch the File Control component, and then configure this component to communicate over the established links to peer devices running associated components.

In step 1820, the application and omnichannel cloudlet are ready and they execute the application.

As shown in decision block 1826, during the execution of the application, the endpoint binding on the device monitors the operating conditions. Should they change drastically forcing a reconfiguration of the application, the device contacts the mediator with the new conditions in order to optimize the running application (i.e., flow returns to step 1810 as per the "YES" branch of block 1826). To avoid multiple devices reporting the same topology change information to the mediator, devices may elect a single device as the topology manager, or may prioritize the devices such that the mediator will ignore lower priority topology changes if it has received a higher priority one.

In the absence of any topology change, simply continue to execute the application, as per the "NO" branch of block 1826.

When the user is finished with the app, the app can shut down in step 1822. Shutting down can cause all links to be severed and all application state(s) to be flushed from the devices. Alternatively, some application state and topology information can be cached for future use.

Logical flow ends in step 1824.

Thus, one or more embodiments provide a system for application-projection pairing with synchronous content sharing between at least two devices, including at least one end point component at a host device including a discovery component for discovering available target devices and services, a connection component for connecting host to target devices along an application messaging channel, an application launching component for instructing secure launching of application components on a target device; and a messaging component for allowing exchange of data and control messages securely between the host and target devices; and at least one end point component at each remote target device including a connection component for connecting devices along an application messaging channel, an application launching component for securely launching application components at the target device; and a messaging component for receiving/exchanging data and controlling messages from/with the host device.

Furthermore, one or more embodiments provide a method for application-projection pairing with synchronous content sharing between at least two devices, including the steps of a host device discovering at least one available target device for pairing; connecting the host device to at least one available target device along an application messaging channel; securely launching an application on the target device as a projection of the application currently running on the host device; and ending data and control messages from the application on the host device to the projection of the application on the at least one target device.

In some cases, data replication components are provided to transfer data to the correct application at the target device. In some cases, an interface with a transactional system is provided to commit any changes. Some embodiments include multichannel discovery; multichannel linking; and/or cloud component mediation, authentication, and/or authorization. In some cases, the host application runs projections on multiple different devices.

Recapitulation

The skilled artisan will thus appreciate that one or more embodiments include aspects addressing different layers of omnichannel application implementation. Advanced Application Projection represents the lowest of the layers and addresses how to enable multiple devices to communicate in an omnichannel application (in some sense this can be thought of as a link layer, albeit in a sense different than used in networking research). Advanced Application Projection addresses modifications required to the current state of the art to enable an omnichannel application to be run in an optimal fashion on multiple devices.

Advanced Split Screen Support relates to a layer that has several aspects. In one aspect, this layer facilitates a developer building an omnichannel application. Furthermore, when building the application, this layer allows the developer to be mindful that pieces of the application will run on different devices. Yet further, this layer assists in placing different pieces of the omnichannel application on different devices in an optimal manner. Optimization can include, for example, how the devices communicate.

Managing Data Replication and Governance in Omnichannel Applications relates to a layer that addresses a framework for how to build an optimizer. Exemplary techniques include network algorithms such as the spanning tree algorithm, minimal cost network techniques, and the like. Optimization can be carried out with one or more different goals in mind, i.e., rapid data transfer, long battery life, minimize use of expensive networks, and so on.

Referring again to FIG. 16, some embodiments provide a client-side system including endpoint binding, a link manager, and a component registry. The endpoint binding modules facilitate communication between the devices 1602, 1604, 1606 and the cloud; the link manager modules maintain communications links between the devices 1602, 1604, 1606; and the component registry keeps each particular client device 1602, 1604, 1606 informed of what components it is running.

Given the discussion thus far, and with reference again to FIGS. 6-8, it will be appreciated that, in general terms, an exemplary method, according to an aspect of the invention, includes the step 804 of obtaining, at a replication optimizer running on at least one hardware processor in a network node, a request from a first remote device to join a group of remote devices executing an omnichannel application. Said request includes a common key identifying said group of remote devices executing said omnichannel application. This step can be carried out, for example, with group registry 602. An additional step 810 includes adding said first remote device to said group of remote devices executing said omnichannel application. This step can also be carried out, for example, with group registry 602. A further step 812 includes updating topology of said group of remote devices executing said omnichannel application to obtain an updated group topology. This step can be carried out, for example, with topology monitor 604. An even further step 814 includes establishing a data replication plan for said group of remote devices executing said omnichannel application, based on said updated group topology. This step can be carried out, for example, with replication planner 608. Yet a further step includes obtaining, at said replication optimizer running on at least one hardware processor in a network node, an indication from one device of said group of remote devices executing said omnichannel application, that a data update has occurred for said omnichannel application on said one device of said group of remote devices executing said omnichannel application. Consider the data update of step 718 being received in the cloud. This step can be carried out, for example, with event module 610. Another step includes sending, from said replication optimizer running on at least one hardware processor in a network node, to said group of remote devices executing said omnichannel application, at least one of: (i) said data replication plan; and (ii) instructions in accordance with said data replication plan; to specify how said data update for said omnichannel application on said one device of said group of remote devices executing said omnichannel application is to be propagated to remaining devices of said group of remote devices executing said omnichannel application. This step can be carried out, for example, with an instruction propagation module such as synchronization service 606 or event module 610. In some embodiments, the instruction propagation module includes a messaging broker in the cloud. In some cases, instead of the cloud pushing messages to the clients, the clients periodically communicate with the cloud to obtain updates. In this latter case, clients occasionally execute a synch (synchronization) to look for updates using synch service 606.

In some cases, said step of establishing said data replication plan for said group of remote devices executing said omnichannel application, based on said updated group topology, comprises establishing said plan to reduce use of metered networks during said propagation of said data update to remaining devices of said group of remote devices executing said omnichannel application.

In some cases, said step of establishing said data replication plan for said group of remote devices executing said omnichannel application, based on said updated group topology, comprises establishing said plan to reduce energy cost during said propagation of said data update to remaining devices of said group of remote devices executing said omnichannel application.

In some embodiments, said step of establishing said data replication plan for said group of remote devices executing said omnichannel application, based on said updated group topology, comprises establishing said plan to consider priority of data updated during said data update.

In some embodiments, an additional step includes advising said remaining devices of said group of remote devices executing said omnichannel application of said data update prior to said propagation of said data update to said remaining devices of said group of remote devices executing said omnichannel application.

In another aspect, with reference again to FIGS. 11 and 12, another exemplary method includes the step 1104 of loading, at a component manager running on at least one hardware processor in a network node, a specification for an omnichannel application to execute on a group of remote devices. Said omnichannel application has a plurality of components including at least one view component and at least one headless component. This step can be carried out, for example, with registry 1210. A further step 1106 includes building, with said component manager running on said at least one hardware processor in said network node, a model describing how said group of remote devices is configured. This step can be carried out, for example, with topology modeler 1214. A still further step 1110 includes creating, with said component manager running on said at least one hardware processor in said network node, a flow plan, based on said specification and said model, describing which of said plurality of components should be executed on which individual devices of said group of remote devices and how data should flow to individual devices of said group of remote devices. This step can be carried out, for example, with planner 1212. Another step 1112 includes sending said flow plan from said component manager running on said at least one hardware processor in said network node, to said group of remote devices. This step can be carried out, for example, with a suitable messaging module; RPC 1218 is a non-limiting example. Some embodiments send the message through a messaging broker.

Some embodiments further include step 1114, monitoring, with said component manager running on said at least one hardware processor in said network node, device events from said group of remote devices; and, responsive to at least one of said device events, revising, with said component manager running on said at least one hardware processor in said network node, said model describing how said group of remote devices are configured, to obtain a revised model. Refer to decision block 1116 and step 1106. A still further step in such instances includes repeated step 1110, creating, with said component manager running on said at least one hardware processor in said network node, a revised flow plan, based on said specification and said revised model, describing which of said plurality of components should be executed on which individual devices of said group of remote devices and how data should flow to individual devices of said group of remote devices. An even further step (repeated step 1212) includes sending said revised flow plan from said component manager running on said at least one hardware processor in said network node, to said group of remote devices.

In some cases, said step of creating said flow plan comprises creating said flow plan based on user intent and connectivities of said group of remote devices.

In some cases, said step of creating said flow plan comprises creating said flow plan such that at least one device of said group of remote devices obtains said data directly from an external data source and such that at least one other device of said group of remote devices obtains said data indirectly from a member of said group of remote devices.

In some instances, the step of building said model comprises building said model as a data sink and source map; and said step of creating said flow plan comprises creating said flow plan to reduce redundant data retrievals.

In still another aspect, with reference again to FIGS. 17 and 18, still another exemplary method includes the step 1804 of authenticating, at an omnichannel mediator running on at least one hardware processor in a network node, a remote device that wishes to participate in an omnichannel cloudlet to execute an application. This step can be carried out, for example, with omnichannel group registry 1704. A further step includes, responsive to said authentication, sending, from said omnichannel mediator running on said at least one hardware processor in said network node, to said remote device that wishes to participate in said omnichannel cloudlet to execute said application, instructions enabling said remote device that wishes to participate in said omnichannel cloudlet to execute said application to enter said omnichannel cloudlet with at least one other remote device. Consider the server side of step 1806. This step can be carried out, for example, with messaging broker 1710. A still further step 1810 includes obtaining, at said omnichannel mediator running on said at least one hardware processor in said network node, topology and operating state information regarding said remote devices in said omnichannel cloudlet. This step can also be carried out, for example, with messaging broker 1710. An even further step includes, based on said topology and operating state information regarding said remote devices in said omnichannel cloudlet, and based also on application component configuration policies, preparing, with said omnichannel mediator running on said at least one hardware processor in said network node, link instructions specifying how said remote device is to link to said at least one other remote device within said omnichannel cloudlet. Consider the server side of step 1814. This step can be carried out, for example, with application component configuration policies 1708. Another step includes sending, from said omnichannel mediator running on said at least one hardware processor in said network node, to said remote device that wishes to participate in said omnichannel cloudlet to execute said application, said link instructions. Consider the server side of step 1814. This step can be carried out, for example, with application component configuration policies 1708.

In some cases, further steps include obtaining (repeated step 1810), at said omnichannel mediator running on said at least one hardware processor in said network node, updated topology and operating state information regarding said remote devices in said omnichannel cloudlet; based on said updated topology and operating state information regarding said remote devices in said omnichannel cloudlet, and based also on said application component configuration policies, preparing (repeated server side of step 1814), with said omnichannel mediator running on said at least one hardware processor in said network node, updated link instructions specifying how said remote device is to link to said at least one other remote device within said omnichannel cloudlet; and sending, from said omnichannel mediator running on said at least one hardware processor in said network node, to said remote device that now participates in said omnichannel cloudlet to execute said application, said updated link instructions.

In some cases, in said step of sending said instructions enabling said remote device that wishes to participate in said omnichannel cloudlet to execute said application to enter said omnichannel cloudlet with said at least one other remote device, said omnichannel cloudlet already exists.

On the other hand, in some cases, in said step of sending said instructions enabling said remote device that wishes to participate in said omnichannel cloudlet to execute said application to enter said omnichannel cloudlet with said at least one other remote device, said omnichannel cloudlet does not already exist, and said instructions enabling said remote device that wishes to participate in said omnichannel cloudlet to execute said application to enter said omnichannel cloudlet with said at least one other remote device comprise instructions for forming said cloudlet.

In some instances, in said step of obtaining said topology and operating state information, said operating state information comprises central processing unit usage data and type of network connectivity.

In another aspect, an exemplary system is provided for coordinating, from a network node (e.g., in the cloud 408), a group of remote devices (e.g., 1602, 1604, 1606) executing an omnichannel application. Said system includes an omnichannel mediator 1506 that coordinates formation of at least two of said remote devices into an omnichannel cloudlet. The system also includes a component manager 1220 that controls which of a plurality of components of said omnichannel application should optimally be placed on which individual devices of said omnichannel cloudlet and how data should flow to individual devices of said omnichannel cloudlet. The system further includes a replication optimizer (see FIG. 6) that optimally coordinates data replication for the group of remote device.

In some cases, the system includes a memory, and at least one processor that is coupled to the memory and operative to perform exemplary method steps; for example, by executing discrete software modules described herein.

In some cases, said replication optimizer optimally coordinates said data replication for the group of remote devices to minimize use of expensive metered network connections.

In some instances, said component manager optimally controls said component placement and data flow to increase resiliency of the omnichannel cloudlet to loss of an individual device.

In some instances, said component manager optimally controls said component placement and data flow to take into account differing data storage capabilities of devices in said omnichannel cloudlet.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and or sub-modules/sub-blocks in FIGS. 5, 6, 9, 10, 12, and 15-17, such as any one, some, or all of a group registry module, a topology monitor module, a replication planner module, an event module, an instruction propagation module, a registry module, a modeler module, a planner module, a messaging module, an omnichannel group registry module, a messaging broker module, and an application component configuration policies module. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a network node, a method that coordinates a group of remote devices executing an omnichannel application, wherein the network node includes a processor that is configured by computer-executable instructions to implement the method comprising:

obtaining, from a first remote device of the group of remote devices, a request to join an omnichannel cloudlet;
authenticating, by consulting a group registry, that the first remote device is allowed to join the omnichannel cloudlet;
sending to the first remote device instructions that enable the first remote device to join the omnichannel cloudlet by executing the omnichannel application with at least one other remote device of the group of remote devices;
controlling which of a plurality of components of the omnichannel application is placed on which individual devices of the omnichannel cloudlet and how data flows to individual devices of the omnichannel cloudlet; and
coordinating data replication for the group of remote devices by sending, to the group of remote devices, at least one of a data replication plan and instructions consistent with the data replication plan.

2. The method of claim 1, method further comprises coordinating the data replication for the group of remote devices to minimize use of at least one metered network connection.

3. The method of claim 1, wherein the coordinating data replication further comprises controlling data flow to increase resiliency of the omnichannel cloudlet to loss of one or more of the devices in the group of remote devices.

4. The method of claim 1, wherein controlling placement of the devices further comprises controlling component placement and data flow to take into account differing data storage capabilities of devices in the omnichannel cloudlet.

5. A computer program product for configuring a network node to coordinate a group of remote devices executing an omnichannel application, the computer program product comprising:

a computer readable storage medium having encoded thereon:
first program instructions executable by a processor to cause the processor to:
coordinate formation of at least two of said remote devices into an omnichannel cloudlet;
obtain a request from a first remote device to join the omnichannel cloudlet;
authenticate, by consulting a group registry, that the first remote device is allowed to join the omnichannel cloudlet; and
send to the first remote device instructions that enable the first remote device to join the omnichannel cloudlet by executing the omnichannel application with at least one other remote device of the group of remote devices;
second program instructions executable by the processor to cause the processor to control which of a plurality of components of said omnichannel application is placed on which individual devices of said omnichannel cloudlet and how data flows to individual devices of said omnichannel cloudlet; and
third program instructions executable by the processor to cause the processor to coordinate data replication for the group of remote devices by sending, to the group of remote devices, at least one of a data replication plan and instructions consistent with the data replication plan.

6. The computer program product of claim 5, wherein the third program instructions cause the processor to coordinate data replication for the group of remote devices to minimize use of at least one metered network connection.

7. The computer program product of claim 5, wherein the third program instructions cause the processor to control data flow to increase resiliency of the omnichannel cloudlet to loss of one or more of the devices in the group of remote devices.

\* \* \* \* \*